Aug. 4, 1953 V. D. GRONDONA 2,647,318

STEREOPHOTOGRAMMETRIC RESTORER

Filed Oct. 31, 1950 15 Sheets-Sheet 1

INVENTOR

VALENTIN DOMINGO GRONDONA

BY [signature]

ATTORNEYS

INVENTOR
VALENTIN DOMINGO GRONDONA
BY
ATTORNEYS

INVENTOR
VALENTIN DOMINGO GRONDONA
BY [signature]
ATTORNEYS

Aug. 4, 1953 V. D. GRONDONA 2,647,318

STEREOPHOTOGRAMMETRIC RESTORER

Filed Oct. 31, 1950 15 Sheets-Sheet 4

INVENTOR
VALENTIN DOMINGO GRONDONA
BY
ATTORNEYS

INVENTOR
Valentin D. Grondona
BY
ATTORNEY

INVENTOR
VALENTIN DOMINGO GRONDONA
BY [signature]
ATTORNEYS

Aug. 4, 1953

V. D. GRONDONA 2,647,318

STEREOPHOTOGRAMMETRIC RESTORER

Filed Oct. 31, 1950

15 Sheets-Sheet 7

INVENTOR
VALENTIN DOMINGO GRONDONA
BY
ATTORNEYS

INVENTOR
VALENTIN DOMINGO GRONDONA
BY [signature]
ATTORNEYS

Aug. 4, 1953 V. D. GRONDONA 2,647,318

STEREOPHOTOGRAMMETRIC RESTORER

Filed Oct. 31, 1950 15 Sheets-Sheet 9

INVENTOR
VALENTIN DOMINGO GRONDONA
BY [signature]
ATTORNEYS

INVENTOR
VALENTIN DOMINGO GRONDONA
BY
ATTORNEYS

Aug. 4, 1953 V. D. GRONDONA 2,647,318

STEREOPHOTOGRAMMETRIC RESTORER

Filed Oct. 31, 1950 15 Sheets-Sheet 11

INVENTOR
VALENTIN DOMINGO GRONDONA
BY
ATTORNEYS

Aug. 4, 1953 V. D. GRONDONA 2,647,318

STEREOPHOTOGRAMMETRIC RESTORER

Filed Oct. 31, 1950 15 Sheets-Sheet 12

INVENTOR

VALENTIN DOMINGO GRONDONA

BY

ATTORNEYS

Aug. 4, 1953 V. D. GRONDONA 2,647,318

STEREOPHOTOGRAMMETRIC RESTORER

Filed Oct. 31, 1950 15 Sheets-Sheet 13

INVENTOR
VALENTIN DOMINGO GRONDONA
BY
ATTORNEYS

Aug. 4, 1953

V. D. GRONDONA 2,647,318

STEREOPHOTOGRAMMETRIC RESTORER

Filed Oct. 31, 1950

15 Sheets-Sheet 14

INVENTOR
VALENTIN DOMINGO GRONDONA
BY
ATTORNEYS

INVENTOR
VALENTIN DOMINGO GRONDONA.
BY
ATTORNEYS

Patented Aug. 4, 1953

2,647,318

UNITED STATES PATENT OFFICE 2,647,318

STEREOPHOTOGRAMMETRIC RESTORER

Valentin Domingo Grondona, Rosario, Argentina

Application October 31, 1950, Serial No. 193,090
In Argentina April 7, 1945

19 Claims. (Cl. 33—20)

This invention relates to a stereophotogrammetric restorer which operates by solving an analytical formula by means of kinematic devices and is continuation-in-part of my application Serial No. 588,943, filed April 18, 1945, and now abandoned.

The known stereophotogrammetric restorers are very large in size and the correct operation thereof can only be performed by very skilled operators.

The stereophotogrammetric restorer according to the invention comprises a magnifying stereoscope and a stereoscopic photograph carrying platform both in operative relationship with manually operable means for controlling azimuth, distance and elevation and with a drawing instrument in order to record the restoration to be made. During the following description and claims the "magnifying stereoscope" will simply be called "stereoscope"; but it is understood that said stereoscope is preferably of the type which at the same time magnifies the images.

More particularly the present invention refers to a stereophotogrammetric restorer comprising a first bridge, a stereoscope mounted on said first bridge and including a left eyepiece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, a transverse bar linking said two basic bars, two upstanding supports each fixed to a respective basic bar in parallel relationship to said plane of symmetry, said basic bars supporting substantially the several parts of the apparatus, a stereoscopic photogram carrying platform parallel to said first bridge, a first manually operable means for moving said platform perpendicularly to the plane of symmetry, a second manually operable means for moving said platform parallel to said plane, said first manually operable means comprising a first screw spindle supported by said basic bars perpendicularly to said plane of symmetry, a first cursor slideably mounted on said first screw spindle, a first rod constituting a driving connection between said first cursor and said platform, a hand-wheel for turning said first screw spindle, a first column and a second column slideably mounted one on each basic bar and supporting a second bridge, a third bridge, a fourth bridge, a fifth bridge and a sixth bridge, a third column and a fourth column mounted on said transverse bar and adjacent said two basic bars, said third and fourth columns supporting a seventh bridge and eighth bridge, a ninth bridge and also said first bridge, said first and second columns being position-controlled by corresponding manually controlled, coupled second and third screw spindles, a second cursor coaxial with said first cursor and rotatably mounted thereon, a third cursor slideably mounted on said second bridge and provided with a second rod rotatably supporting a fourth cursor and a fifth cursor, said fifth cursor being slideably along said third bridge, a bar having two end portions, one end-portion being slideably mounted in said second cursor and another end portion being slideably mounted on said fourth cursor, a first pin pivotally supported by said seventh and eighth bridges, said bar being pivoted to said first pin, a polar pantograph comprising a plurality of articulated meshes and having a pole, an actuating point and a writing point, a first block, a second pin, a graduated circular member being mounted on said transverse bar, a guide rotatably mounted on said circular member, said first block being rectilinearly displaceable in said guide, said first block constituting a housing for said second pin, said pole of said pantograph being coupled to said second pin, said actuating point of said pantograph being coupled to said first rod, said second manually operable means comprising a fourth screw spindle provided with a hand-wheel for manual control and supported by said first and second columns below said fourth bridge and above said third bridge, a sixth cursor mounted on said fourth screw spindle and displaceable along said fourth bridge, a seventh cursor pivotally linked to said sixth cursor and displaceable along said third bridge, a right angle lever having a first arm and a second arm linked together by a second block, said second block being rotatably supported by said first pin, said first arm passing through said seventh cursor, each of said upstanding supports slideably supporting a bar arranged parallel to said upstanding support and substantially parallel to said stereoscopic photogram carrying platform, said bars being coupled together by two parallel spaced rails perpendicular to said plane, said stereoscopic photogram carrying platform being provided with rollers slideably mounted on said rails, said second arm of said right angle lever being coupled to one of said bars supported by said upstanding supports, a stereoscopic parallax compensator means coupled to said stereoscope and to a link mechanism comprising a system of pivoted links forming a rhombus of variable angle including vertices defined respectively by a first pivot pin, a second pivot pin, a third pivot pin and a fourth pivot pin, said first pivot pin being coupled to said sixth bridge and said third pivot pin being connected to said ninth bridge and coaxial with said first pin, a pair of additional links of equal length, a fifth pivot pin pivotally coupling together said additional links at one of their ends, the other ends of said additional links being connected respectively to said second and fourth pivot pins, said fifth pivot pin being located on the side of said third pivot pin remote from said first pivot pin and being connected to said movable stereoscopic parallax compensator means, a second bar having a first portion fixed to said first bar and a second portion parallel to and vertically spaced from said first bar, said second portion having a fulcrum connected to said ninth bridge and coaxial with said first pin, a free end arranged in motion transmitting relationship with an eighth cursor slideably supported by said fifth bridge, said eighth cursor being in operative relationship with an angularly adjustable slideway supported by said fifth bridge and with a ninth cursor slideably connected to said fourth bridge.

From the foregoing it will be apparent that an object of the present invention is to provide an apparatus of reduced dimensions and weight which can be easily handled, transported and installed on any suitable drawing board.

Another object is to provide an apparatus which shall be simple to operate, thereby eliminating all complications and uncertainty in connection with the way of operation of the apparatus so that even a non-specialized surveyor can use it.

A still further object of the present invention is to eliminate all empirical calculations in connection with the setting and handling of the apparatus.

These and further advantages and objects of the present invention will become apparent in the course of the following description taken in connection with the accompanying drawings illustrating by way of example a stereophotogrammetric restorer in two of its embodiments.

In the drawings:

Figure 15 is a fragmentary sectional view taken along lines XV—XV of Figure 11, but in an enlarged scale.

In order to facilitate the comprehension of the structural embodiments of the stereophotogrammetric restorer, the theoretical development, which constitutes the basis thereof, is first explained.

Theory of the Stereophotogrammetric Restorer of the Present Invention

(a) *Surveying operations*

Figure 1:
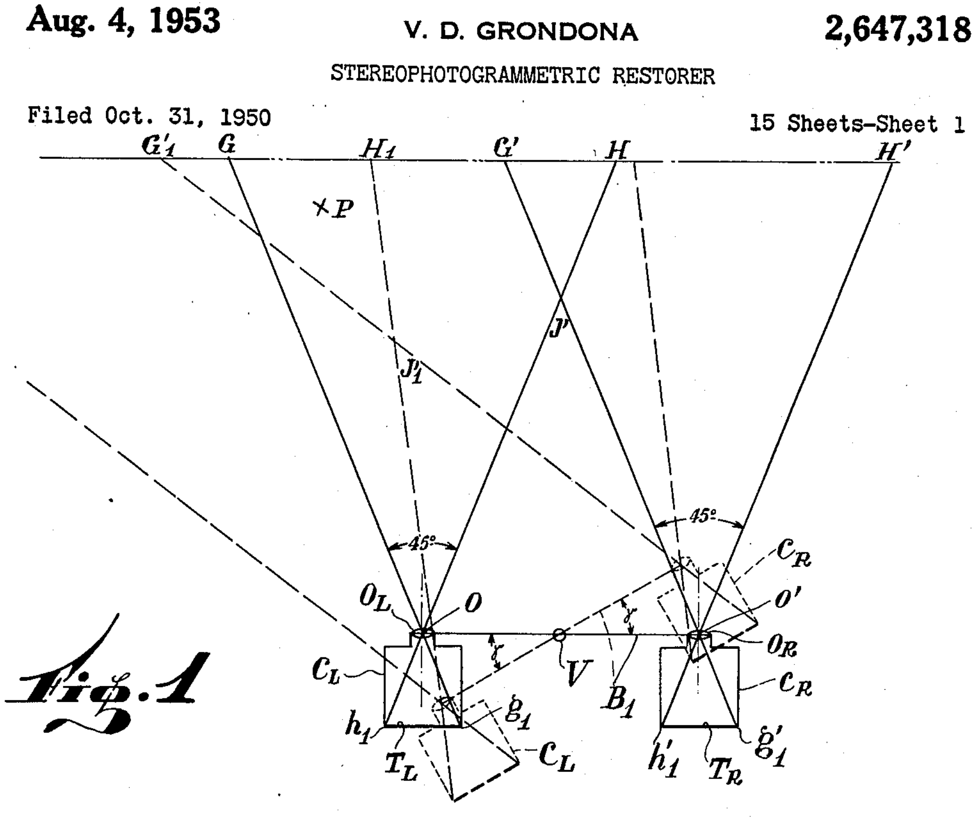
Figure 1 is a diagram showing an arrangement of two cameras for surveying a terrain stereoscopically with fixed coplanar cameras.
Figure 2:
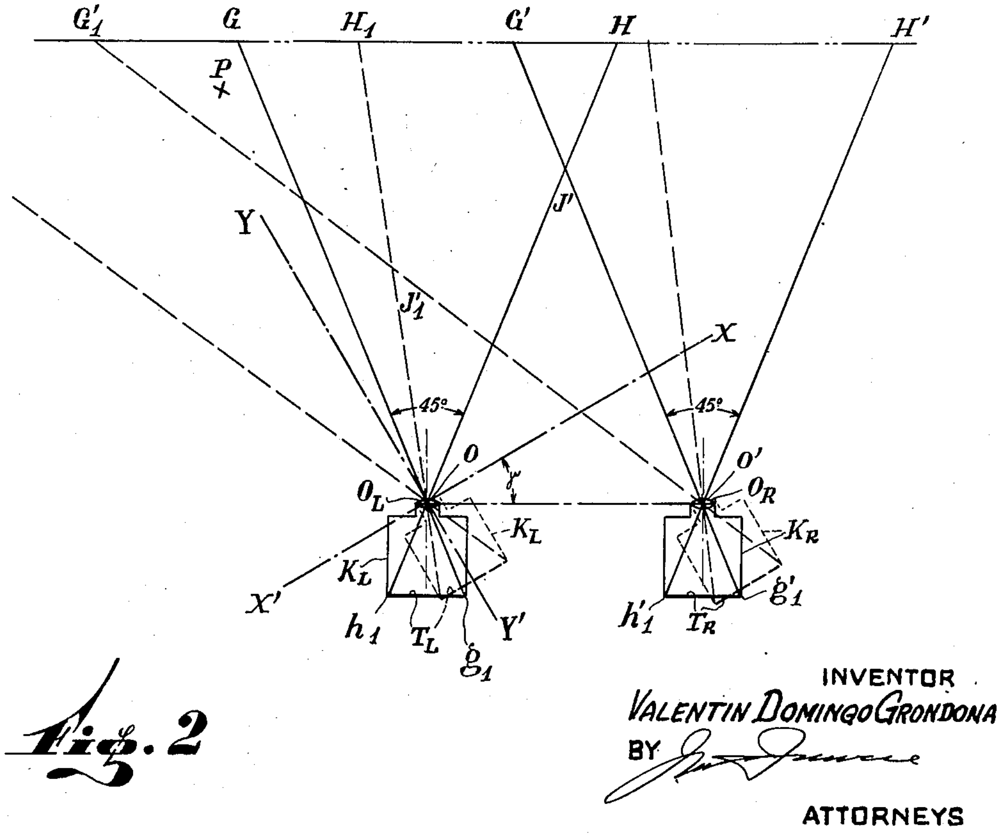
Figure 2 is a diagram showing an arrangement of two cameras for surveying a terrain stereoscopically with two cameras, individually movable about their respective optical centres.

There are two fundamental ways of arranging the cameras for surveying a terrain stereoscopically, as shown schematically in Figures 1 and 2.

(*i*) In the arrangement shown in Figure 1 a left camera $C_L$ and a right camera $C_R$ are rigidly mounted on a horizontal bar $B_1$ rotatable about its center or pivot V. The left camera $C_L$ has an objective $O_L$ and a photographic plate $T_L$, and the right camera $C_R$ has an objective $O_R$ and a photographic plate $T_R$.

It is assumed for the purpose of this explanation, that the left and right objectives of the respective cameras can each take a field of 45°. Therefore the left camera $C_L$ will take a field represented by the triangle OHG, wherein O represents the optical center of the left objective $O_L$; $g_1$ and $h_1$ represent the equivalent end points on the photographic plate $T_L$ of G and H on the terrain. Similarly, the right camera $C_R$ will take a field represented by the triangle O'H'G', wherein O' represents the optical center of the right objective $O_R$; $g_1'$ and $h_1'$ represent the equivalent end points on the photographic plate $T_R$ of G' and H' on the terrain. Upon placing the photograms corresponding to plates $T_L$ and $T_R$ in a photocomparator it will be possible to perceive a stereoscopic image of the superimposed parts of the two fields OHG and O'H'G', that is to say of the field corresponding to triangle J'HG'. If a given point on the terrain such as P is to be surveyed stereoscopically, and the point P is not within the triangle J'HG', then the arrangement of bar $B_1$ together with the cameras $C_L$ and $C_R$ is rotated about pivot V, for instance through 30° (angle $\gamma$), as shown in Figure 1 in broken lines. Triangle $J_1'$ $H_1$ $G_1'$ which represents an area hereinafter called "steroscopic area" encloses point P. If desired, a succession of partially overlapping stereoscopic areas can be taken so as to obtain by subsequent composition, a complete view of a large field. In the case illustrated in Figure 1, it would be sufficient to take a third view in an intermediate position, between the two positions shown, as by rotating the bar arrangement $B_1$, $C_L$, $C_R$ through 15° with regard to the first position, and thereby it is possible to obtain larger composite fields than the stereoscopic fields the lenses of the cameras are per se able to capture in any one given position.

It is to be noted that by using the arrangements as described, the photographic plates of the left and right cameras are always coplanar. Furthermore the "base" of this arrangement of the left and right cameras would be the length of the segment determined by the position of the optical centers of the objectives of the two cameras. In other words in Figure 1 the "base" would be the segment OO', no matter what position the bar $B_1$ occupies.

(*ii*) One form of the second way of arranging the cameras for surveying, has been schematically illustrated in Figure 2. This arrangement has also a left camera, identified by reference character $K_L$, and a right camera $K_R$. In practice these two cameras may be one and the same camera, and the views are then taken separately and at different instances. Since there is no mechanical linkage between the two stations where the photographs are taken either by two or by one and the same camera, the distance existing between the two positions may be considerably larger than in the first arrangement and thereby obviously a larger field may be captured. Each camera is rotatably mounted on its support, a tripod for instance. The cameras are first positioned with their optical axes perpendicular to the base line, as indicated by the position shown in full lines which corresponds to the full line position of Figure 1, and therefore the same reference characters have been used for like elements.

The difference with regard to the first arrangement described resides in the fact that in order to increase the field, i. e. in order to be able to survey "point P" of the terrain, in this case each of the left and right cameras $K_L$ and $K_R$, respectively, are turned about its own respective axis which passes through the optical centers O and O'. The position shown in broken lines corresponds to a rotation of 30° (angle $\gamma$), similarly as in the case of Figure 1.

In this embodiment, it has to be noted that in "the 30° position" the plates $T_L$ and $T_R$ are not coplanarly but parallelly mounted. OO' is the "base." In order to obtain calculated results in terms of cartesian coordinates, an origin is selected conveniently at the optical center of one of the objectives, for example the objective O belonging to the lefthand camera $K_L$ in the drawing. O will therefore also be the origin of the cartesian coordinates. The axis of abscissae XOX' is conveniently taken as parallel to the plates $T_L$ and $T_R$. Hence the axis of ordinates YOY' will be a perpendicular to the plates $T_L$ and $T_R$ passing through the optical center which is the origin O.

Since after rotation of both cameras $K_L$ and $K_R$ through equal angles, the plates $T_L$ and $T_R$ remain parallel, but the line joining the optical centers O and O', that is to say the "base" OO' is no longer parallel to the plates, and since the axis of abscissae is parallel to the plates by construction, the "base" OO' will make an angle, say the angle $\gamma$ (in this instance of 30°) with the axis of abscissae.

Figure 3:
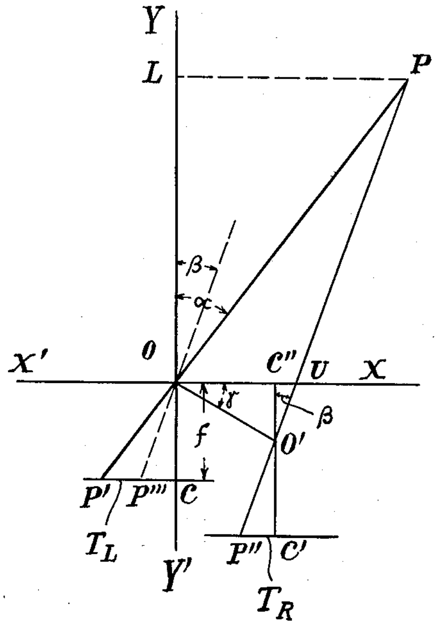
Figure 3 is a draft illustrating the geometric analysis of the surveying operation on the terrain.

(*iii*) The analysis of the surveying operation which may be carried out with any of the arrangements described or similiar ones, is illustrated in Figure 3, in which the axes of coordinates illustrated in Figure 2 are shown after rotation of the whole diagram about the origin O through an angle $\gamma$ to the right in Figure 2 so as to bring the axes of coordinates parallel with the edge of the sheet. Also in Figure 3, for clearness, the coplanar position of the plates has not been shown.

Furthermore in order that the discussion shall be applicable to all the practically possible interrelationships of positions of the two cameras, the line OO' in the diagram of Figure 3 and similar figures, is to be understood as being the vertical projection on the horizontal plane of the real physical base defined by the actual position of the optical centers of the objectives. This projection will be called "the horizontal projection of the base." When the cameras or rather the optical centers are at the same level, said horizontal projection of the base has the same length as the base itself, but when the optical centers are so located at different levels that the line joining them, that is to say the base, makes an angle $\psi$ with the horizon plane, then of course the horizontal projection of this base will have a length equal to "base·cos $\psi$." Remembering this, any necessary correction to adjust the formulae in terms of the real base can readily be made.

Hence also the term "base" as hereinafter used will mean either the real base for objectives of equal level, or the horizontal projection thereof, indiscriminately.

P represents again the point of the terrain to be surveyed. From the construction described it will be seen that the optical axis of the right camera $K_R$ (Fig. 2) is parallel to the axis of ordinates YOY' which cuts the axis of abscissae XOX' at C'', and the optical axis of the left camera $K_L$ (Fig. 2) coincides with the axis of ordinate. The focal length $f$ of the objectives is represented in Figure 3 by the intercepts OC and O'C'.

The images of P will be respectively P' (left) and P'' (right) on the plates $T_L$ and $T_R$. The azimuth angles will simultaneously be $\alpha$ and $\beta$. On tracing through O a line parallel to O'P'', this line intersects the left plate $T_L$ at P'''. Hereby the "stereoscopic parallax" $e$ of P is represented by the intercept P'''P'.

If from P we draw the rays PP' and PP'' passing respectively through O and O' and cutting the axis of abscissae at O and U respectively, they will form a triangle OPU which is similar to P'OP''', so that:

$$\frac{OP}{OP'}=\frac{OU}{P'P'''} \quad (1)$$

but $$OP'=\frac{f}{\cos\alpha}$$

and $$OU=OC''+C''U$$

and in turn $$OC''=OO'\cos\gamma$$

if the length of segment OO' represented in Figure 3 is $b$ then $$OC''=b\cos\gamma$$

On the other hand $$C''U=C''O'\tan\beta$$

and $$C''O'=b\sin\gamma$$

so that $$OU=b\ (\cos\gamma+\tan\beta\sin\gamma)$$

If the length of segment OP is $d$, from (1) we obtain:

$$d=\frac{f}{\cos\alpha}\cdot\frac{b(\cos\gamma+\tan\beta\sin\gamma)}{e}$$

and if the function enclosed by the brackets is divided by $\cos\gamma$, we obtain:

$$d=\frac{f-b\cos\gamma(1+\tan\beta\tan\gamma)}{e\cos\alpha}\qquad(2)$$

Let the coordinates of P be $x, y$; shown in Figure 3 as segments LP and OL; then:

$$y=d\cos\alpha$$

so that $$y=\frac{fb\cos\gamma}{e}(1+\tan\beta\tan\gamma)$$

With coplanar plates $\gamma$ vanishes, that is to say:

$$d=\frac{fb}{e\cos\alpha};\ y=\frac{fb}{e}$$

(b) *Restoring operations*

Figure 4:
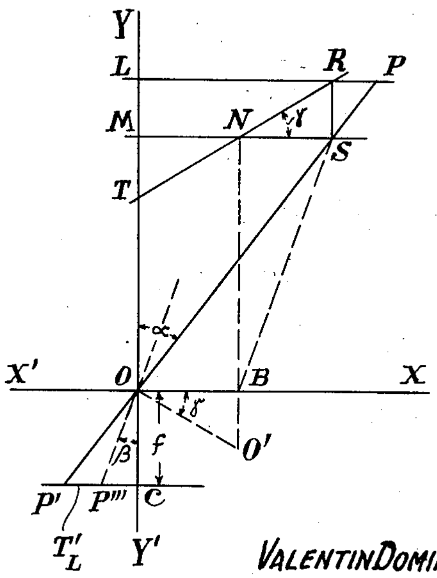
Figure 4 is a draft showing the geometric layout of the operation of restoring a point of the terrain.

Referring now to Figure 4, with origin O a pair of orthogonal coordinates is drawn with an axis of abscissae XOX' and axis of ordinates YOY'. A segment OO' of length $b'$ forms with the axis of abscissae an angle $\gamma$ of equal sense and magnitude as that which the plane of the left photogram $T_L$ (see Figures 1 to 3) forms with the "base" line, which angle was at the time measured, by means of a usual limb arrangement which is provided in either of the devices described in Figure 1 or 2. On tracing the ordinate from O' we obtain, on the axis of abscissae, the projection B.

Let it be assumed that the optical axis of OC (which represents the focal length $f$) of the left photogram $T_L'$ coincides with the axis of ordinates YOY', so that the optical center O of the objective coincides with origin O, therefore bearing the same reference character. (The manner in which this coincidence can be achieved in the practical apparatus will be explained hereinbelow.) Photogram $T'_L$ carries point P' which is the image of the homologous point of the terrain to be restored. Azimuth angle $\alpha$ has been restored in P'OC. The difference of parallax $e$ is established by means of a photocomparator, and thus $$e=P'P'''$$

in abscissae. Consequently P'''OC is the azimuth angle $\beta$, which corresponds to the right-hand station.

If we trace through B a line parallel to P'''O, it will cut P'O produced at S, whereby a triangle OSB is formed which is similar to P'OP''', wherein:

$$\frac{OB}{P'P'''}=\frac{OS}{OP'}\qquad(3)$$

But $$P'P'''=e$$
$$OB=b'\cos\gamma$$

Through S draw a line parallel to the axis of abscissae XOX', which line intersects the axis of ordinates YOY', at point M. Let the length of the ordinate OM be $l$; then we obtain:

$$OS=\frac{l}{\cos\alpha}$$

substituting these equations in (3), we have:

$$\frac{b'\cos\gamma}{e}=\frac{l}{f}$$

and therefore:

$$l=\frac{fb'\cos\gamma}{e}\qquad(4)$$

From B draw the ordinate BN to cut MS at N. Through this point N a straight line is drawn to form with MS an angle $\gamma$ and cut the axis of ordinates YOY' at T; hence the length of TN will be $b'=b$.

From the point S draw a perpendicular to MS to cut TN produced at R; and through line R draw a line parallel to the axis of abscissae XOX' to cut YOY' at L and P'S produced at P, which point P will be the restored point, whose ordinate is OL. The length of segment OL is $y'$.

In fact:

$$y'=OM+ML$$
$$y'=l+SR$$

but $$SR=NS\tan\gamma$$

and in turn $$NS=NB\tan\beta$$

Since $$NB=l$$

we obtain:

$$y'=l+l\tan\beta\tan\gamma$$

that is to say $$y'=l(1+\tan\beta\tan\gamma)\qquad(5)$$

By relating Equations 4 and 5:

$$y'=\frac{fb'\cos\gamma}{e}(1+\tan\beta\tan\gamma)$$

Assuming that the lengths of OP is $d'$, the distance of P from O will be:

$$d'=\frac{y'}{\cos\alpha}$$

and therefore $$d'=\frac{fb'\cos\gamma(1+\tan\beta\tan\gamma)}{e\cos\alpha}\qquad(6)$$

making $\gamma=0$ for coplanar plates, we have $$d'=\frac{fb'}{e\cos\alpha};\ y'=\frac{fb'}{e}$$

on comparing Equations 2 and 6 we find $$\frac{b}{b'}=\frac{y}{y'}=\frac{d}{d'}=\text{constant}=F$$

which, since it constitutes the coefficient of proportionality between the magnitudes on the terrain and their homologues in the restorer, will for the practical apparatus represent the working scale on which the operation of the scale-bearing members is based. In order to determine the scale of the drawing it will be necessary to multiply the indications of these scale-bearing members by the inverse of the amplification factor of the polar pantograph with which this apparatus is conveniently provided, as will be hereinafter explained.

The magnitude $$l=\frac{fb' \cos \gamma}{e} \qquad (4)$$

is represented in the apparatus by the main diagonal of a Peaucellier diamond JAMDO (Figure 5, which will be later explained), which diamond satisfies the equation $$lw=m^2-n^2$$

and therefore $$l=\frac{m^2-n^2}{w} \qquad (7)$$

wherein $l=OM$
$w=OJ$
$m=AM=MD=DJ=JA$
$n=AO=DO$ and since $$b'=\frac{b}{F}$$

$$l=\frac{fb \cos \gamma}{eF}$$

and therefore $$\frac{m^2-n^2}{w}=\frac{fb \cos \gamma}{eF}$$

Thus the relation $$\frac{W}{e}$$

could be expressed as $$\frac{w}{e}=\frac{F(m^2-n^2)}{fb \cos \gamma} \qquad (8)$$

and constitutes a proportionality factor which is carried out, structurally by means of a conjugated lever system interconnected by means of a variable coupling which defines the magnitude $t$.

In order to facilitate the understanding of how this proportionality factor is structurally obtained, reference is again made to Figure 5 in which a conjugated lever system comprises a first lever EF', which in the theoretical explanation represents the magnitude $g$; a second lever G''F'', which in the theoretical explanation represents the magnitude $i$; a variable coupling, preferably by means of a cursor I which couples levers EF' and G''F''. The variable distance existing between the intersection F''' of the longitudinal axis of the cursor I with lever EF' and the end F' of said lever is the above mentioned magnitude $t$; a third lever G''H'', the length of which in the theoretical explanation will be represented by value $j$. Lever G''H'' is fixed at G'' to lever G''F''. The end H'' of lever G''H'' is coupled suitably to one end of an arm Q guided for rectilinear reciprocation, the other end of which is suitably connected to the right end of the photocomparator, as will be later explained. From the link system described, it will be clear that displacement of point J with respect to fixed point O will be transmitted to give a proportional displacement of said other end of arm Q. After adjustment of the initial position of point J, the distance JO will always be represented by the variable $w$. Now, the said link system is so designed that the distance through which said other end of arm Q is displaced consequently on displacement of J, shall be equal to $e$ (stereoscopic parallax). Also the working scale to be adopted depends on the position of cursor I with regard to levers EF' and G''H'' and involves therefore the evaluation of $t$.

From this proportion of the link system we have first:

$$\frac{w}{e}=\frac{g}{t}\,\frac{i-t}{j}$$

therefore:

$$\frac{w}{e}=\frac{g(i-t)}{tj} \qquad (9)$$

and cursor I of the conjugated lever or restorer system will correctly transmit the movement thereof to the telescope objective which has to be compensated for the stereoscopic parallax. From (9) we obtain:

$$t=\frac{i}{\frac{j}{g}\cdot\frac{w}{e}+1}$$

substituting for $$\frac{w}{e}$$

we have $$t=\frac{i}{\frac{Fj(m^2-n^2)}{gfb \cos \gamma}+1}$$

Combining all constants of the instrument into one factor $$\frac{j(m^2-n^2)}{gf}=K$$

the expression is simplified to $$t=\frac{i}{\frac{FK}{b \cos \gamma}+1} \qquad (10)$$

(c) *Schematic arrangement of the apparatus*

Although for the analytical demonstration of the apparatus the base OO' has been drawn, this is not done during the restoring step, as the magnitude $l$, instead of being obtained "projectively" from Equation 4, is determined "kinematically" by means of Equations 7 and 9, hence $$l=\frac{tj(m^2-n^2)}{eg(i-t)} \qquad (11)$$

The apparatus which will hereinafter be described in greater detail has been built mainly of articulated levers so arranged as to substantially represent the diagram of Figure 4. In the process of restoring, which will now be described in connection with Figure 5 it will be apparent by implication that what has been schematically illustrated in Figure 5 corresponds substantially to Figure 4.

The images of both photograms $T_L'$ and $T_R'$ are made to coincide stereoscopically with the marks of the grids of the stereoscope which will be later described, for which purpose the right hand side of the comparator can be contracted. This movement is caused by the lever arrangement F''G''H''Q pivoted at G'' and governed by the lever EF' by means of cursor I. Lever EF', in turn is pivoted at F' and operated by the restorer system, the center of which is located at point O (origin). Upon setting of the photograms $T_L'$ and $T_R'$ (which is equivalent to virtual elimination of the parallax), the magnitude $l$ is obtained (see Equation 11) at the same time in the other branch of the system, since the vertex of the main diagonal of the rhombus coincides with M, which is pivoted to a bridge here represented by the double line $A_b$ parallel to the axis of abscissae. A guide here indicated by the double line $A_c$ is articulated to the bridge at N and forms with the bridge an angle $\gamma$ but in a sense opposite to that formed by the base line with respect to the planes of the photograms $T_L'$ $T_R'$, this guide being arranged in such a manner that it will intersect OM or OM produced at a point T such that TN represents to scale the projection of said base line $b'$.

Pivot N will, by the usual convention, always remain to the right of the axis of ordinates. The "focussing" of a point on the left photogram $T_L'$ requires a movement of the right photogram $T_R'$ along the axis of abscissae and ordinates, which photogram $T_R'$ is mounted on a movable supporting platform. The first displacement of said platform takes place along a guide indicated by line $A_d$ parallel to XOX' and located at a distance $f'$ equal to the focal length of the objective of the camera therefrom, causes a rotation of a lever indicated by line $A_e$ and reconstructs the azimuth angle $\alpha$, the axis of the lever occupying the position of the restored line of sight.

The lever represented by line $A_e$ is pivoted at the origin O and extends therebeyond to intersect the double line $A_b$ (representing the bridge) at a point S.

From point S, there extends a line $A_f$ perpendicular to $A_b$ to cut $A_c$ at R and through R a line $A_g$ parallel to $A_b$ extends to cut $A_e$ which is the restored line of sight, at a point P. The intercepts SR, RP vary in accordance with the inclination of the base (angle $\gamma$) and with the azimuth angle $\alpha$. Point R moves along $A_c$ to constantly maintain its orientation, while P is moved along $A_g$ on varying the azimuth angle $\alpha$, or along an ordinate when the distances are changed by displacement of $A_g$ with respect to XOX'.

A displacement from a point $B_2$ to $B_2'$ along a guide represented by line $A_h$ parallel to YOY' and located at a distance therefrom equal to $f'$, reconstructs the elevation angle $\delta$ with respect to the center of the photogram, said angle $\delta$ being suitably indicated in the apparatus as will hereinafter be made clear. Diagrammatically a line $A_j$ permanently perpendicular to a line $A_k$ is rotatable with $A_k$ about O. $A_k$ cuts $A_h$ at a variable point $B_2$ and $A_j$ cuts $A_g$ at a variable point Z. The abscissae $z$ of the point Z represents to a suitable scale the tangent of $\delta$. Similarly the abscissae $x$ of P represents tan $\alpha$.

Once the localization of point O has been obtained by means of the coupling between the different mechanisms, the segment OP=$d'$ represents the radius vector of the restored point on the same scale on which the base $b'$ has been also restored. By utilizing a pantograph whose pole is located on the vertical axis passing through O, and whose operated end point is located at P, the lengths of the aforementioned radius vector will have been multiplied by a constant factor in any of the positions thereof, thus obtaining a drawing of greater dimensions, the tracing of which takes place outside the restorer mechanism, such as by means of a writing point $P_0$. If instead of utilizing point O as the pole, the latter is displaced radially and/or circularly by known amounts, the entire system will be related to another point of the plane, which may offer greater advantages as far as the interconnection of the various drawings is concerned, such as would be the case if, on utilizing a telestereoscopic camera during the surveying operation (see Fig. 1), the mean point of the base line were taken as point of origin, this point corresponding to the center of the tripod.

*(d) Simplification for the case of coplanar photograms.*

When the surveyor takes only coplanar photograms, such as for instance with a device as described in connection with Figure 1, it is possible to simplify the apparatus described under item (c).

Figure 5:
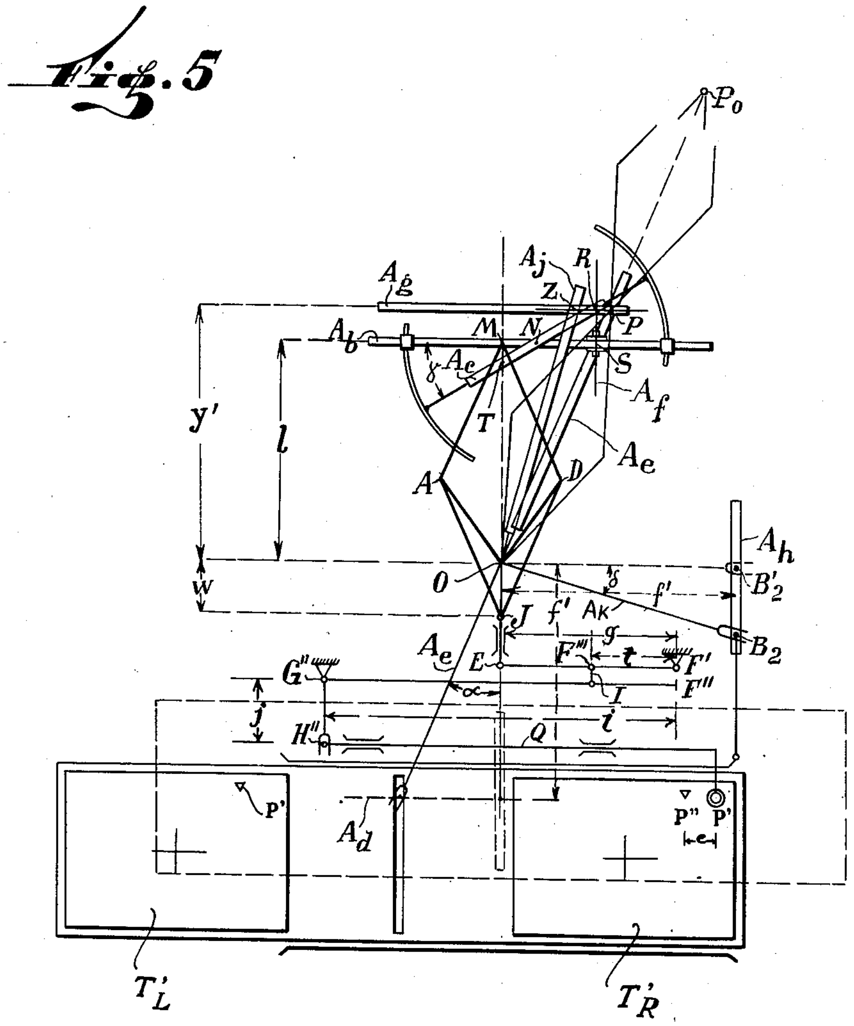
Figure 5 is a plan view of the schematic arrangement of the stereophotogrammetric restorer in accordance with this invention.
Figure 6:
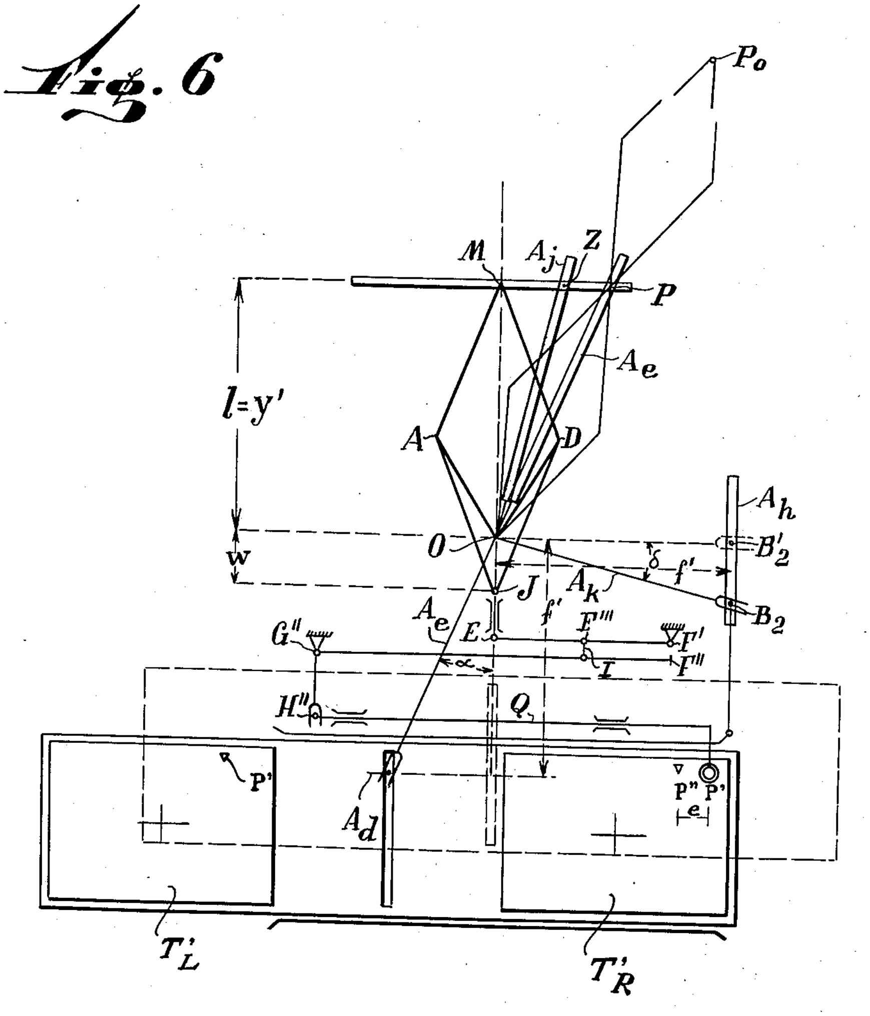
Figure 6 is a similar plan view as Figure 5 but showing the schematic arrangement of a simplified stereophotogrammetric restorer to be used for coplanar plates only.

In Figure 6 a similar schematic arrangement but of an apparatus simplified with regard to Figure 5, has been illustrated. In this apparatus the same reference characters have been used for similar parts as in Figure 5.

From Equation 2, when $\gamma=0$, that is to say for photograms which are coplanar, the formula for the distance is:

$$d=\frac{fb}{e\cos\alpha} \quad (12)$$

and in the embodiment of Figure 6, line $A_b$ of Figure 5 coincides with line $A_g$, since according to (5)

$$l=y'$$

as the expression between the brackets in Equation 5 is equal to unity, in other words, in the case of coplanar photograms the segments OL and OM (Figure 4) would be equal.

According to the scheme of the invertor:

$$y'w=m^2-n^2$$

and therefore $$y'=\frac{m^2-n^2}{w}$$

and furthermore $$d'=\frac{y'}{\cos\alpha}$$

so that $$d'=\frac{m^2-n^2}{w\cos\alpha} \quad (13)$$

Comparing Equations 12 and 13

$$\frac{d}{d'}=\frac{fbw}{e(m^2-n^2)}$$

and by a suitable arrangement of the lever coupling between the invertor and the parallax correcting device of the stereoscope, $w$ is made equal to $$\frac{eg(i-t)}{tj}$$

so that:

$$\frac{d}{d'}=\frac{fb}{m^2-n^2}\left[\frac{g(i-t)}{tj}\right]$$

which, for each value of the expression in square brackets represents the respective working scale F, wherein $$d=Fd' \quad (14)$$

is the simplified tachimetric formula, and according to Figure 6 said expression is a parameter variable at will once the value for $t$ has been set. This formula is nothing more than Equation 9, and by making similar considerations, the cursor of the variable coupling is located in accordance to the working scale:

$$t=\frac{i}{\frac{Fj(m^2-n^2)}{bgf}}+1 \qquad (15)$$

and if all constants are to be included in one common factor:

$$K=\frac{j(m^2-n^2)}{gf}$$

then $$t=\frac{i}{\frac{FK}{b}+1} \qquad (16)$$

For "phototachymetry" by means of the telestereoscopic camera (with constant base) this arrangement allows of considerable simplification of the mechanism of the stereophotogrammetric restorer, and the operations of making, as well as of restoring the photograms are also simplified. The determination of the abscissae and elevations is identical to that explained in paragraph *c*.

Description of the Stereophotogrammetric Restorer

In view of the foregoing explanation, it can be readily visualized that by eliminating several parts and means of the apparatus as described in connection with Figure 5, a simplified apparatus, which can however be used only for coplanar plates, is obtained (see Fig. 6).

Figure 7:
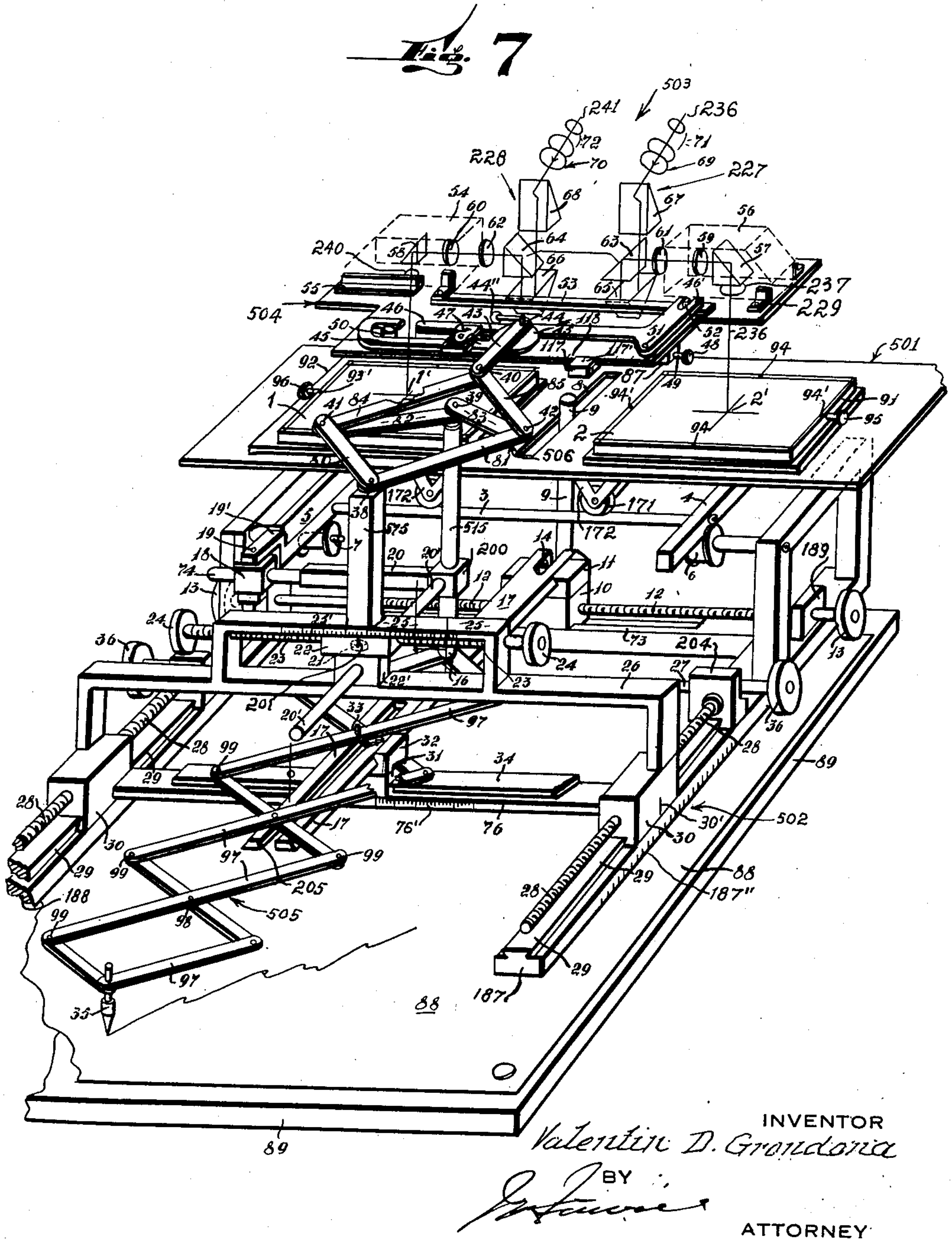
Figure 7 is a schematic perspective view of the structural embodiment of the simplified apparatus of Figure 6.
Figure 8:
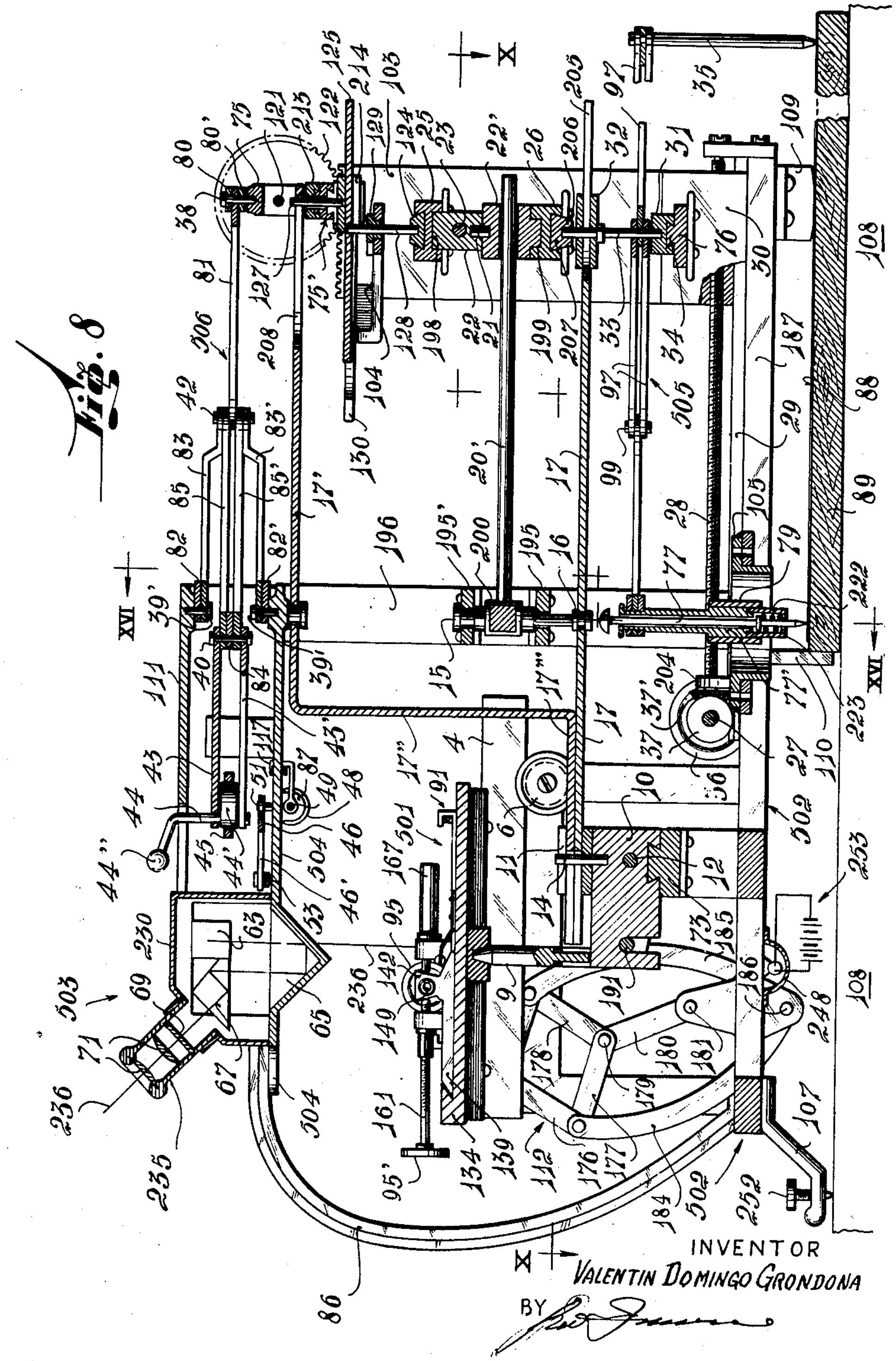
Figure 8 is a lateral elevation of the more elaborate apparatus in its actual structural form (based on the schematic arrangement shown in Figure 5), as viewed from right hand side with respect to the operator's position, with some of the parts shown in section.
Figure 9:
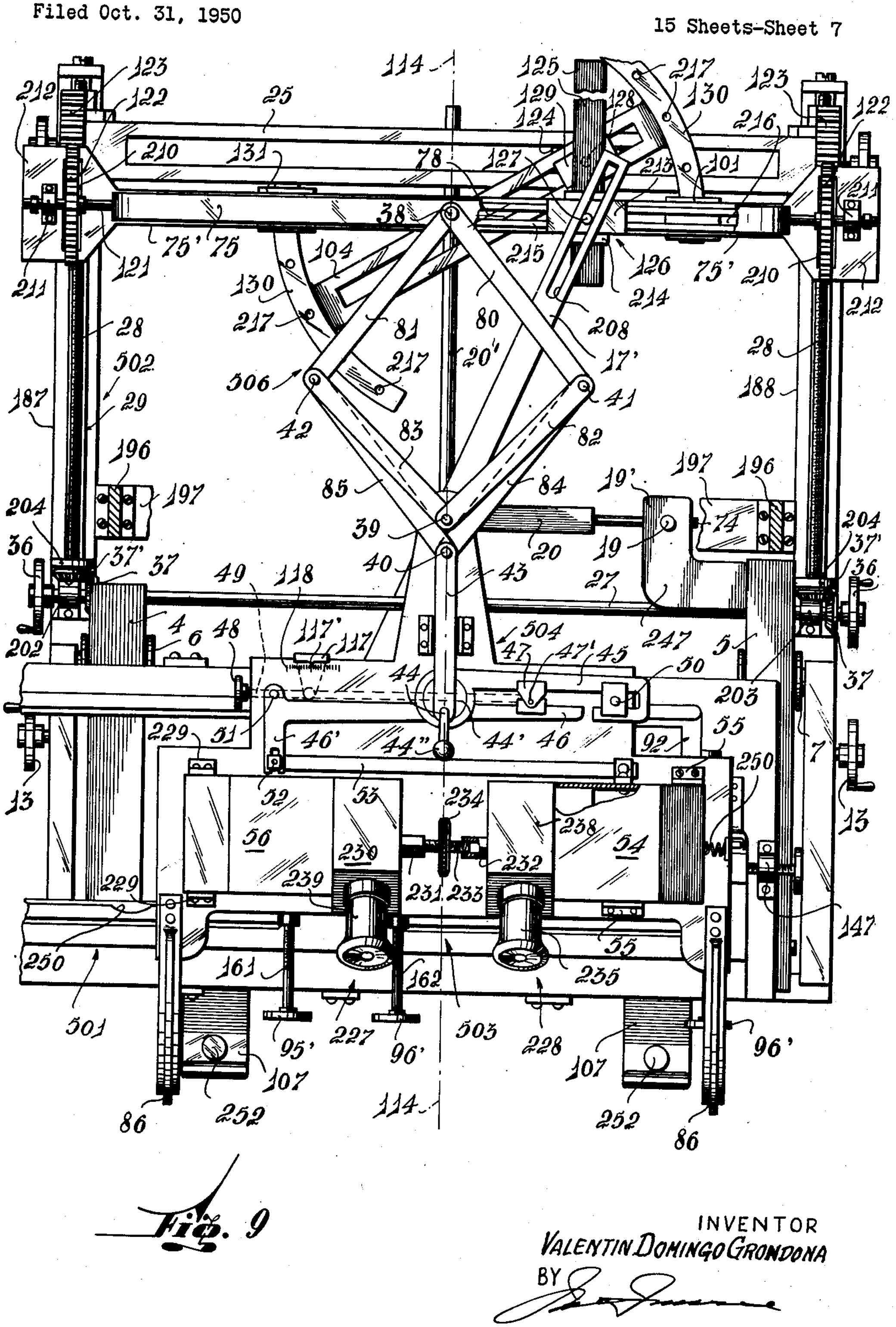
Figure 9 is a part-sectional plan view of the apparatus shown in Figure 8.
Figure 10:
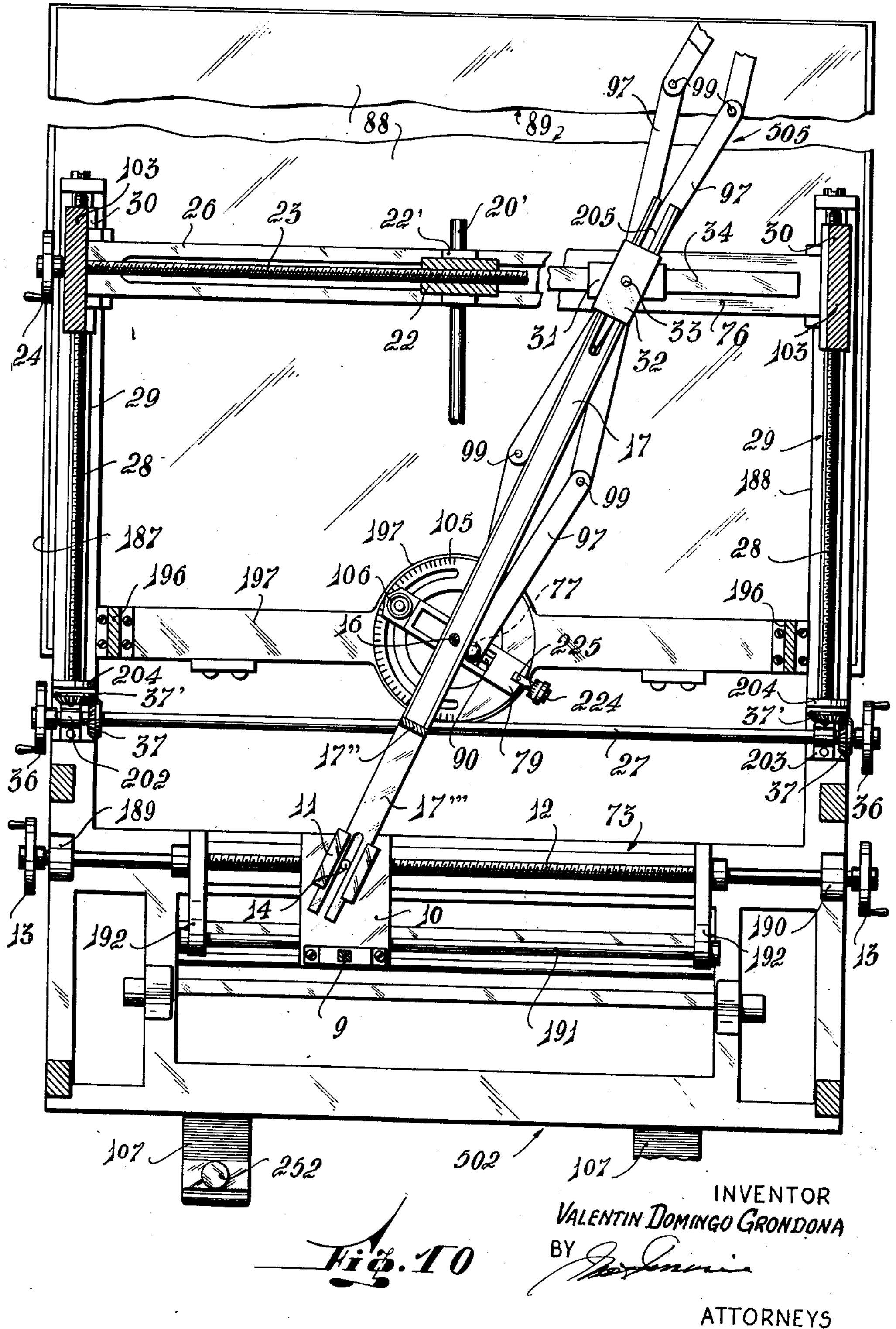
Figure 10 is a part-sectional plan view of the lower part of the apparatus according to line X—X of Figure 8.

The explanation of the structural embodiment will be mainly directed to Figures 8, 9 and 10, representing the stereophotogrammetric restorer provided with means for enabling restorations from all types of plates, i. e., not only from coplanar plates; but occasionally reference is also made to Fig. 7, illustrating the simplified embodiment, shown in a perspective view in order to facilitate the appreciation of the restorer in its actual form. It is obvious that no confusion whatsoever may arise from the fact that cross-references to two different apparatus is made, in view of the previous explanation of Figs. 5 and 6, and due to the fact that the simplifications introduced in the "coplanar restorer" substantially do not modify the shape or distribution of its integral parts, with regard to the other embodiment which merely, as already stated, shows an apparatus in which some parts are eliminated.

In order to facilitate the understanding, a brief description of the main parts of the apparatus will be given first.

As can be seen in Figures 8 and 9, as well as in Figure 7, a horizontal movable platform or carriage 501 is provided with two photogram supports 91 and 92. Said platform or carriage 501 is adapted for movement along and parallel to the axes of abscissae and of ordinates. Said platform or carriage 501 is indirectly supported by base frame 502, which is the main frame of the apparatus. The optical part of the apparatus for enabling the photograms mounted on the supports 91 anad 92 to be scanned consists of a stereoscope 503 mounted on a bridge 504 also supported by said base or main frame 502. The stereoscope 503 is linked to a pantograph drawing apparatus 505 for registering the restoring on a sheet of paper 88 arranged on a drawing board 89, through an inversor mechanism 506.

The photogram supports 91 and 92 which are shown in greater detail in Figs. 11–15, are slidably mounted on the horizontal platform or carriage 501, which has two openings 132 and 133 in order to enable the light rays to pass through said openings to the photographic plates. (See Figs. 12 and 14.) The horizontal platform or carriage 501 provides at the front edge thereof a wedge-guide 134 (Figs. 11, 14 and 15) for guiding two U-shaped members 135 and 136 which, by means of their corresponding wedges, can slide along said wedge guide 134. The outer arms 137 and 138 of the respective U-shaped members 135 and 136 (Fig. 11) as well as the inner arms 139 and 140 each have an upstanding projection 141, 142, 143 and 144. The upstanding projections 141 and 144, corresponding to the outer arms 137 and 138 each has a bore portion 145 (see Fig. 12) in relationship with upstanding projection 141, in which a screw 146 is partially and loosely housed. Said screw 146 is supported by a nut 147 mounted on carriage 501. A handwheel 96 permits control of said right-hand screw 146. The upstanding projection 141 is provided with an identical screw arrangement as upstanding projection 144 and therefore the same reference characters have been used, except that for future identification purposes, the handwheel of the arrangement corresponding to the upstanding projection 141 is identified by 95.

The inner upstanding projections 142 and 143, likewise have each a bore portion 148 which portions are coaxial and in which the free ends of a compression spring 149 are housed. Each of the upstanding projections 141, 142, 143 and 144 is longer than the width of the outer and inner arms 137, 138 and 139, 140, respectively, and extends towards the space limited by each of said U-shaped members 135 and 136.

Each of the photogram supports 91 and 92 comprises a rectangular frame 151 and 152, respectively, in which the plates are located. As can be seen specially in Fig. 14, in which the rectangular frame 152 is shown, which is symmetrical to frame 151, said frame 152 comprises an opening 153 which is smaller than the corresponding opening 133 of platform 501, so that, as will be later explained, even by displacing said rectangular frame 152 the light rays will always be able to illuminate the whole opening 153 and consequently the plate as well, which plate can be arranged in said frame, for which purpose the latter has on one side, an internal rectangular groove 154 in which is mounted a leaf spring 249, and on the opposite side another internal groove 155 which has an inclined face whereby the plate may be held properly over the opening 153. If instead of a plate, a photogram is used which might cockle or crinkle, glass plates may be positioned over and under such image bearing member.

Figure 11:
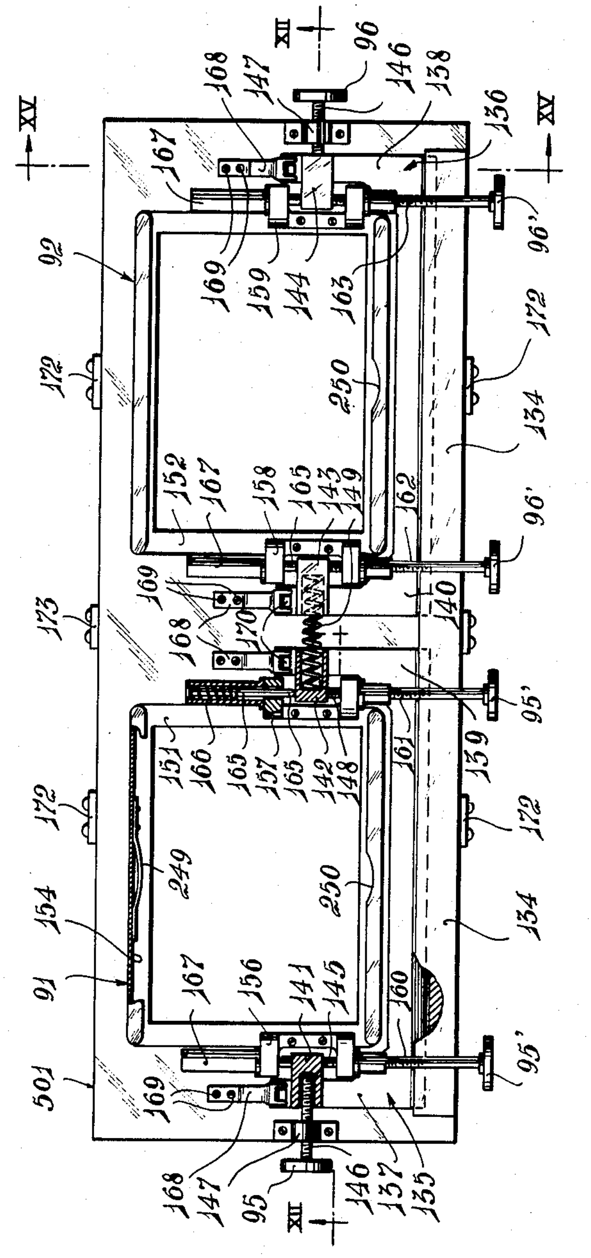
Figure 11 is a plan view of the photogram supports.
Figure 12:
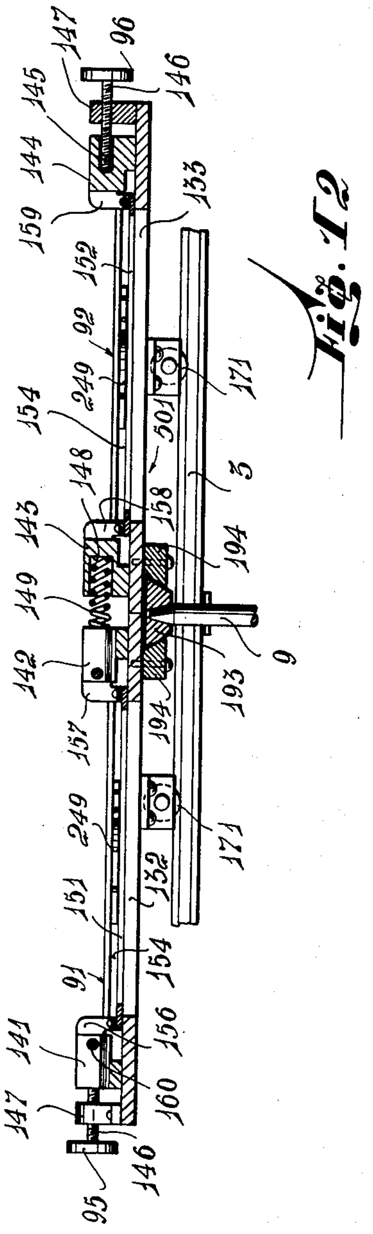
Figure 12 is a section of the photogram supports, along lines XII—XII of Figure 11.

As can be seen in Fig. 11 the rectangular frames 151 and 152 having fixed thereto U-shaped supporting members 156, 157, 158 and 159, which (see also Fig. 14) are each provided with an adjustment screw 160, 161, 162 and 163. The adjustment screws 160 and 161 are controlled by hand wheels 95' and the adjustment screws 162 and 163 are controlled by hand wheels 96'. Since the remaining arrangement of the said adjustment screws 160—163 are substantially identical, reference will now be made only to Figs. 11 and 14 and to adjustment screw 162. The free end 164 of adjustment screw 162 butts against the upstanding projection 143. The opposite side of said upstanding projection 143 is spring pressed by means of a pin 165 spring urged by spring 166 housed in housing 167 supported by U-shaped supporting members 156 to 159.

It will already now be understood that if it is desired to move either of the rectangular frames 151 or 152 such as for centering the photographic plates, as will be later explained, a movement along or parallel to the axis of abscissae is obtained by turning handwheel 95 for rectangular frame 151 and handwheel 96 for rectangular frame 152 against the action of spring 149, whereby the U-shaped member 135 or 136 will slide along the wedge guide 134. If a displacement along or parallel to the axis of ordinates is desired this can be achieved by turning the two handwheels 95′ and 96′ for the respective frames, against the action of spring urged pin 165. On the other hand upon turning the two handwheels 95′ or 96′ to an unequal extent, the respective frame will perform a rotational movement, so that all kinds of adjustment may be achieved. In order to avoid a certain play of this arrangement, each U-shaped member such as member 136 is spring pressed in one direction by means of a leaf spring 168 fixed at one end on the horizontal platform 501 by means of two screws 169 (see Figs. 11 and 15) and provided at the other end with a suitable roller 170 which tends to push simultaneously the U-shaped members 135 and 136 towards the wedge-guide 134 and the horizontal platform 501.

If desired each of the photogram supporting assemblies may be pivoted so as to enable the photograms to be alined with each other, as will be clear to those skilled in the art.

As already previously stated horizontal platform 501 is adapted for movement along and parallel to the axes of abscissae and ordinates. To this end as can be seen in Fig. 7 and partially in Fig. 8 and more in detail in Figs. 13 and 14, said horizontal platform or carriage 501 is supported by rollers 171 mounted on suitable bearings 172, which rollers roll over two rails 3 joined to the supporting bars 4 and 5, which is only schematically shown in Fig. 7, wherein one of said rails is illustrated in the form of a rod, whereas in practice, as may be seen in Figs. 13 and 14, said rails 3 are T-rails. In order to prevent platform 501 from being unduly lifted and thereby causing the rollers 171 to jump out of their rail 3, a guard 173 is provided on each side, which is fixed at one end at the platform 501 and partially surrounds with its other end said rail 3, as can only be seen in Figs. 13 and 14.

Supporting bars 4 and 5 are slidably supported on the one hand by rollers 6 and 7 as can be seen in Figs. 7 and 8 while on the other hand each of said bars 4 and 5 is also linked to a trestle 112 (see Figs. 8, 13 and 14) formed by a plurality of articulated bars or levers, whereby it is assured that said bars will always move in the same plane, and in these particular arrangements along or parallel to the axis of ordinates.

Figure 13:
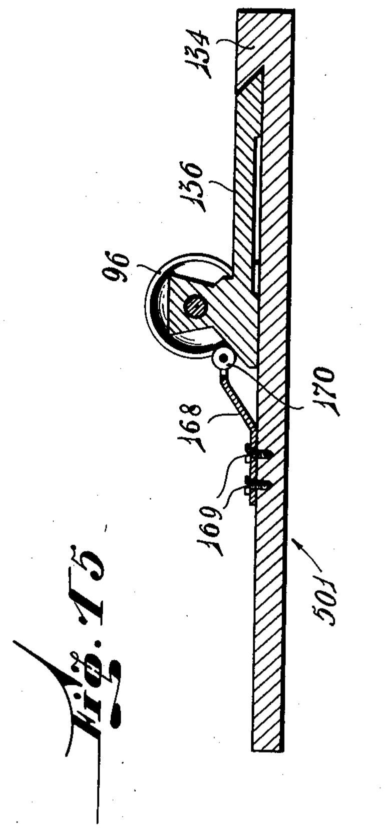
Figure 13 is a part-sectional front elevation of the horizontal platform supporting the photogram supports and also showing the supporting means of said horizontal platform.
Figure 13:
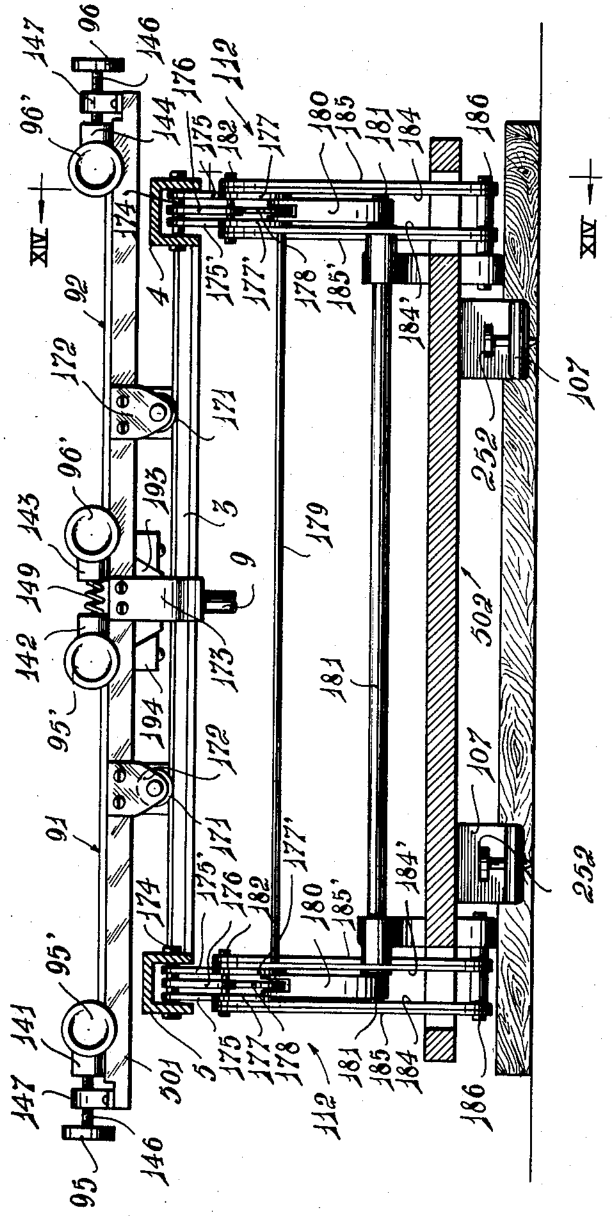
Figure 14:
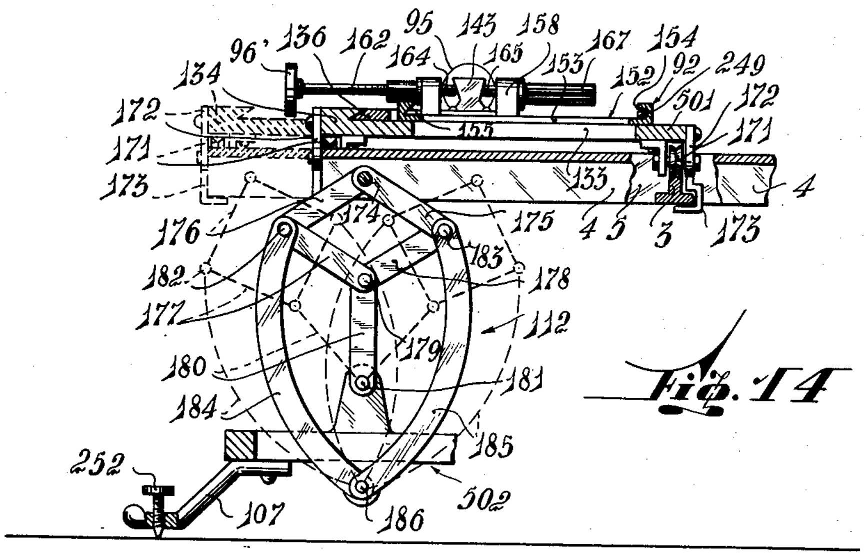
Figure 14 is a section along line XIV—XIV of Figure 13 with some parts omitted.

As can be more clearly seen in Figs. 13 and 14, wherein reference will be preferably made to the trestle 112 connected to bar 4, said trestle is connected to bar 4 by means of a pin 174 to which bars 175 and 176 of equal length are pivoted. Said bars 175 and 176 form together with bars 177 and 178 a rhombus. Bars 177 and 178 are pivoted to a shaft 179, to which also bar 180 is pivoted, the other end of which is oscillatably mounted on spindle 181. Pins 182 and 183 to which bars 176, 177 and 175, 178 are respectively pivoted, constitute also the pivoting center of bars 184 and 185 pivoted together and to the base frame 502 by means of pin 186. Bar 180 constitutes the radius of a circle passing through the center of shaft 179 and pin 186. In practice, in order to avoid bending and twisting of the several bars, these bars are compensated. By "compensated" it is to be understood that one of a pair of bars having a common linkage is doubled. As can be seen in Fig. 13, the doubled bars are indicated and identified by the corresponding reference number and the same reference number with an index.

It will be readily understood by those skilled in the art that the trestle maintains the bar 5 in the horizontal plane, due to the fact that the segments $$\overline{179\text{—}186}\times\overline{174\text{—}186}=\overline{182\text{—}186}^2-\overline{182\text{—}179}^2$$

In other words, the horizontal line passing through pin 174 and the circle of radius 179—181 have the features of "inverse curves" as will be understood by those skilled in the art.

In order to avoid even a slight dephasing between the two trestles these are connected together by means of a common spindle 181 and a common fixed shaft 179.

The base frame 502 has two horizontal basic bars 187, 188 as may be seen in Figs. 7, 8, 9 and 10, said bars 187 and 188 supporting by means of bearings 189 and 190 a screw spindle 12 governed manually by means of handles 13. On said screw spindle 12 (see Figs. 7, 8 and especially 10) a cursor 10 is slidably mounted, to which a vertically upstanding rod 9 is rigidly secured by a rectangular linking. In order to assure a proper movement of cursor 10 (see Figs. 8 and 10), it is slidably mounted on guide 73 and furthermore guided by a rod 191 parallel to said guide 73. Said rod 191 is supported by bars 192, fixed to guide 73.

In Fig. 7 rod 9 is shown as engaging slot 8 of the horizontal platform 501, which is merely a schematical illustration. In fact, as can be seen clearly in Fig. 12, rod 9 is provided at its free end with a double sliding wedge 193 adapted to slide in guide 194 supported by the lower face of the horizontal platform 501. Either of these two arrangements give substantially the same result. Upon actuating handwheel 13, and thereby cursor 10, the horizontal platform 501 will move along or parallel to the axis of abscissae which movement is performed due to the fact that rollers 171 may roll on rail 3. The horizontal platform or carriage 501 is free to move along or parallel to the axis of ordinates since in the case of the simplified apparatus shown in Fig. 7, the horizontal platform 501 with its slot 8 will slide along rod 9 whilst in the embodiment shown in Fig. 12 guide 194 will slide along double sliding wedge 193.

Cursor 10 has pivoted thereto by means of pin 14 (see Fig. 8) a cursor 11 (see also Fig. 10) which slidably engages a double bar 17 and 17′, 17″—17‴.

Double bar 17—17′ are two parallel bars linked together by means of upstanding portion 17″ and horizontal portion 17‴.

Figures 16, 20, 21:
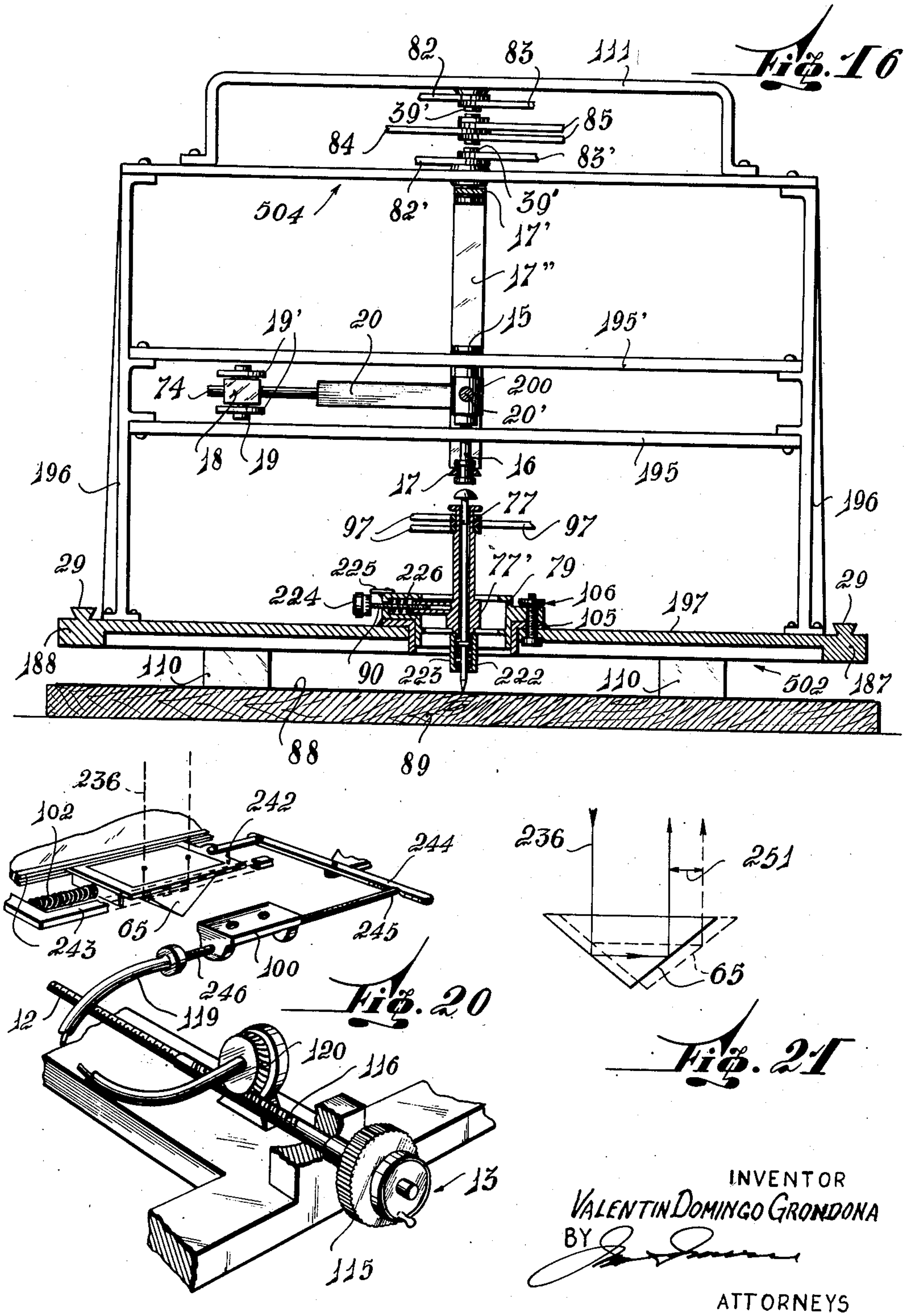
Figure 16 is a section of the apparatus along line XVI—XVI of Figure 8.
Figure 20 is a detail schematic view in perspective of the level compensating means of the optical system.
Figure 21 is a side elevation of the movable prism of the level compensating means of the optical system shown in Figure 20.

Bar 17 pivots about pin 16 supported by bridge 195 supported in turn by columns 196 mounted on transverse bar 197 forming in combination with basic bars 187 and 188 a part of base frame 502 (see also Fig. 16). Said bar 17 may move in a horizontal plane so that, as the projection on the axis of ordinates of the distance between pin 16 and the path of pin 14 is equal to the focal distance of the objective of the photographic cameras used during the surveying operation, the transverse movement of cursor 10 will cause bar 17 to move through angles of the same magnitude as the azimuths of the points of the terrain referred to the optical center of the objective of the left camera with which a photogram has been taken.

Figure 17:
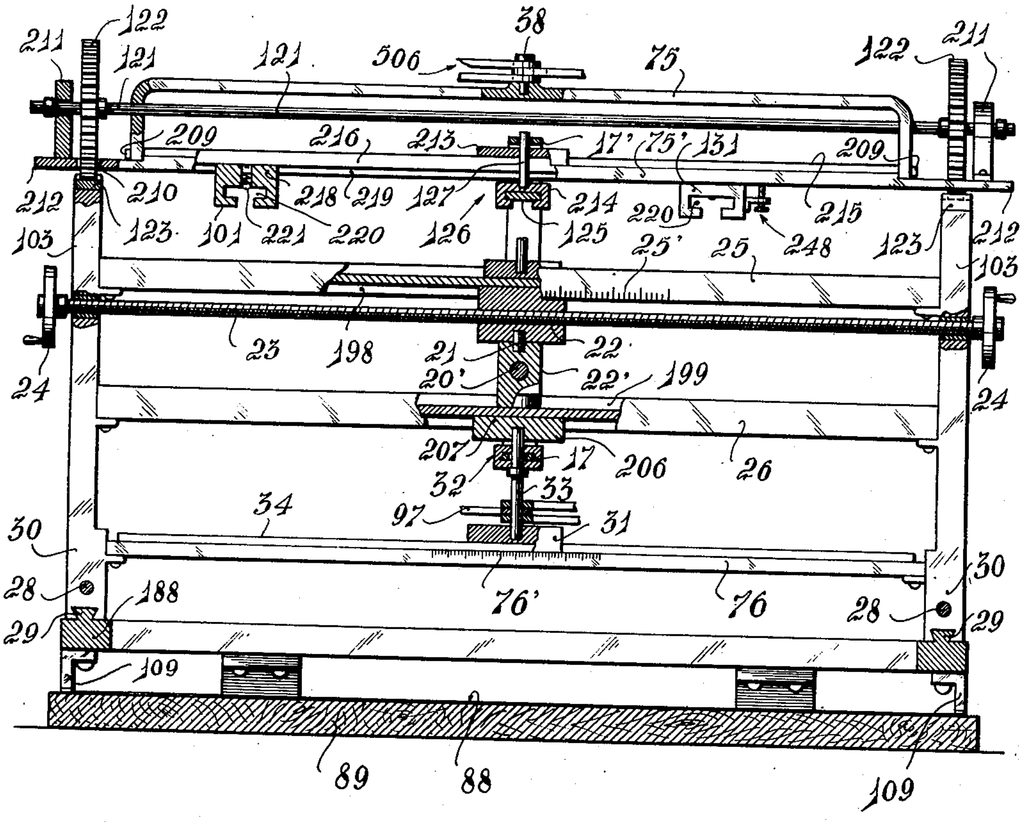
Figure 17 is a front elevation of Figure 8 but with some parts shown in section and other parts omitted.

The basic bars 187 and 188 support blocks 30 as will be later more detailedly explained (see Figs. 7, 8, 10 and 17), which blocks 30 support a bridge 26 and also a second bridge 25. Said bridge 25 is provided with a screw spindle 23 according to the embodiment of Fig. 7, and according to the more elaborate embodiment said screw spindle 23 is supported by columns 103 (see Fig. 17) integral with blocks 30 as will be later explained. Said screw spindle 23 is controlled by handwheels 24. On said screw spindle 23 a slide 22 is mounted which slide is guided by a recess 198 (Figs. 8 and 17). A cylindrical block 22′ is slidably mounted on bridge 26 by means of a recess 199 and at the same time said block 22′ is connected to slide 22 by means of pin 21 (see Figs. 7, 8 and 17).

Bar 5 (see Figs. 7 and 9) ends in a fork 19′ (see also Fig. 16) which supports a block 18 by means of a pin 19. As can be seen in Fig. 9, fork 19′ may conveniently be supported by a cranked arm 247. Said block 18 slidably supports the free end 74 of a right angle lever and more particularly of arm 20 of said right angle lever formed by arms 20 and 20′. The other end of arm 20 is supported by a block 200 supported by its lower part by pin 16 mounted on bridge 195 and on its upper part by pin 15 mounted on bridge 195′ (see also Fig. 16). Pin 16 corresponds to shaft 515 in Fig. 7. One end of arm 20′ is also supported by said block 200 whilst the free end of said arm is slidably mounted in cylindrical block 22′.

The movement along the axis of ordinates of horizontal platform 501 is obtained by means of screw 23 controlled by handwheels 24, said screw acting on slide 22 linked to block 22′, by means of pin 21 for rotation whereby arm 20′, may be rotated, which in turn, through block 200 will act upon arm 20 of the right angle lever. Free end 74 of arm 20 will, through block 18, pin 19 and fork 19′, move bar 5, which together with bar 4 and rails 3, forms the support of platform 501.

In view of the fact that the distance between the axis of shaft 15 and the path of pin 19 is made equal to the focal distance of the objective of the camera, the movement of pin 19 along the ordinate will reproduce with shaft 15 as vertex and the arms 20′ as the arm of the angle, the altitude of the points of the terrain photographed, referred to the optical center of the objective of the left camera. Bridge 25 is provided with an altitude scale 25′, and slide 22 has an index 201, which will indicate on the scale the corresponding altitude (see Fig. 7).

Two handwheels 36, rigidly coupled by means of shaft 27 (see Figs. 7, 8, 9 and 10), rotatably mounted in bearings 202 and 203 fixed on basic bars 187 and 188 respectively, actuate two pairs of conical gears 37 also mounted on said shaft 27, said gears 37 meshing with beveled gears 37′ coupled to twin screws 28, supported by bearings 204 fixed on basic bars 187 and 188. Said twin screws 28 control the position of blocks 30 slidably mounted on guides 29 forming part of basic bars 187 and 188 which in turn constitute part of base frame 502. As already stated blocks 30 support the bridge arrangement of bridges 25 and 26.

Blocks 30, which support bridges 26 and 25, support furthermore in their lower part a bridge 76 (see Figs. 7, 8, 10 and 17). On said bridge 76 a guide 34 exists along which a cursor 31 may move, said cursor 31 having an upstanding pin 33 to which several rods 97 of the drawing apparatus 505, in the form of a pantograph, are linked. Said pin 33 is connected by its upper part to cursor 32 in which bar 17 is slidably mounted. In order to allow said bar 17 to make angular movements, it is provided with a slot 205. Cursor 32 is connected by means of pin 33 to guiding member 206 which by means of its projection 207 is slidably mounted in the lower part of bridge 26 (see Figs. 8 and 17).

In the simplified embodiment as represented in Fig. 7, the drawing apparatus 505 is arranged above bar 17, for reasons which will be later explained. Furthermore bridge 25 is connected to the inversor mechanism 506 through column 575. However in the other embodiment shown in Figs. 8, 9, 10, etc. said column 575 is replaced by a more complicated transmission which will now be described.

In fact, a further twin bridge 75—75′ exists. Bridge 75′ supports bridge 75 (see especially Fig. 17 and also Figs. 8 and 9) and is fixed thereto by means of screws 209. Bridge 75 carries a shaft 121 the ends of which project beyond said bridge and are rotatably supported by bearings 211 mounted on the free ends 212 of bridge 75′. Gears 122 mounted on said shaft 121 between the side portions of bridge 75 and bearings 211 pass each through an opening 210 of bridge 75′ in order to mesh with rack 123 mounted on column 103. These gears thereby support the twin-bridge arrangement 75—75′ and also maintain the latter during its forward and backward movement in parallel alignment with bridge 76 to which is connected the above mentioned drawing apparatus 505.

In view of the foregoing explanation it will be apparent to those skilled in the art that when cursor 31 with pin 33 moves along bridge 76, cursor 32 which is also attached to pin 33 will move in the same direction and cause bar 17 to rotate about its pivot pin 16 (see Figs. 10 and 16), the bar 17 sliding in cursor 32. Bar 17′ of the double bar 17—17′ (see Figs. 8, 9, 16, 17 and 18) will therefore follow the movement of bar 17. Bar 17′ is provided nearer to its free end with a slot 208 operatively connected to pivot pin 127, which pivot pin 127 is guided by double cursor 126 slidably mounted on bridge 75′ by means of its cursor arm 213 which cursor arm is guided by means of guide 215, integral with bridge 75′. The other cursor arm 214 rotatably supported by pivot pin 127 is guided by guide 125 in the form of a rectangular bar. In order to ensure a proper performance of double cursor 126, said double cursor 126 is guided by bridge 75′ having a slot 216 through which pivot pin 127 passes in order to support by its lower end said cursor arm 214.

As may be clearly seen in Fig. 8, guide 125 is pivotally connected through rod 128 to a cursor 124 which slides along bridge 25 and to a cursor 129 movable along slideway 104.

Slideway 104 may be angularly displaced with respect to bridge 75′ by means of graduated sectors 130 (see Figs. 8 and 9) sliding in cursors 101 and 131 which are in turn slidably mounted on bridge 75′ so that slideway 104 may also be displaced longitudinally along bridge 75'. The setting of slideway 104 as well as the accessory means for fixing said slideway 104 in its correct position will be explained later on. The geometrical intersection of slideway 104 and bridge 75' is indicated at 78. By geometrical intersection is understood the point at which the two center lines cut each other.

It will be seen therefore that when, through movement of bar 17', the pivot pins 127 and 128 are caused to move towards the point of intersection 78, twin bridge 75—75' will tend to become superposed over bridge 25 and therefore also over bridges 26 and 76, while movement of bar 17' in the opposite direction will cause the bridges 75' and 25 and ipso facto bridge 76 to be separated from each other. (See Figs. 9 and 18.)

In view of the theoretical explanation, it will be realized that the inclination of slideway 104 corresponds to the angle formed by the base line on the terrain with the left photogram and this inclination may be adjusted by means of said graduated sectors 130. To this end, as may be appreciated in Fig. 9, sector 130 is graduated and each graduation takes the form of a perforation 217. Cursors 101 and 131 are slidably mounted on bridge 75'. As may be seen in Fig. 17, each of the cursors 101 and 131 is provided with a projection 218 meshing with slot 219 formed in the lower surface of bridge 75' so that a parallel and smooth movement of both cursors is ensured. Each of said cursors 101 and 131 has an opening 220 in which each graduated sector 130 is slidably engaged. The opening 220 is provided with a spring urged ball 221 partially entering said opening 220 so that due to the fact that sectors 130 are provided with perforations 217 the correct positioning of said sectors 130 is easily ensured. Cursor 131 is provided with a locking means 248 to lock the arrangement in the desired position. It will, however, be understood that if it is desired to provide an apparatus in which restorations have to be made of photograms unusual as regards the angle at which those photograms have been taken, instead of the spring urged pin 220 and sectors 130 with perforation 217, a more extensively graduated sector may be provided and the setting carried out by any other arrangement as known by those skilled in the art.

The setting of cursors 101 and 131 is established by calculating the projection of the base on the axis of abscissae, i. e., if the distance between the two centers of the objective of the cameras (in the theoretical explanation OO') is known, the result will be obtained by multiplying said distance by the working scale of the apparatus (which scale will be later more clearly explained), and multiplying by the cosine of the angle of the photograms (in the theoretical explanation cos $\gamma$) and dividing by the magnifying factor of the drawing apparatus. In order to facilitate the understanding of the foregoing, an example will be given:

Let us assume that the working scale of the apparatus and therefore the scale of the plan resulting from the restoration should be 1: 1000; the distance between the centers of the objectives, OO', being equal to 2000''; the angle of the photogram $\gamma$ being 30° and therefore cos $\gamma$=0.866.

The formula being:

$$\frac{OO' \times \text{working scale} \times \cos\gamma}{\text{Magnifying factor}}$$

by substituting values we have $$\frac{2000 \times \frac{1}{1000} \times 0.866}{4} = 0.433''$$

The displacements of the cursor 101 and 131 are very small displacements and therefore conveniently these cursors are provided with micrometer screws (not shown).

The above obtained distance corresponds therefore to the segment, the ends of which are the horizontal projections of pin 38 and point 78, i. e., it corresponds to the projection of said base lines on the direction of the photograms in the working scale.

The inversor mechanism 506 as shown in Figs. 7, 8 and 9 comprises a rhomboid formed of bars 80 and 81, 82 and 83 of which bars 80 and 81 are pivoted to the pin 38 which, in the simplified embodiment, is linked to column 575 (see Fig. 7) and the other embodiment is linked to bridge 75 (see Figs. 8, 9 and 17), while bars 82 and 83 are pivoted to pin 39 which is fixed to shaft 515 (see Fig. 7) ending in block 200. In the other embodiment, as can be specifically seen in Figs. 8 and 16, pin 39 is coaxial with pin 15 which is the homologue of shaft 515, but is not integral therewith for reasons which will be later on explained. In turn, bars 80 and 82 are pivoted to pin 41 while on the other hand bars 81 and 83 are pivoted to pin 42. In practice, in order to avoid bending and twisting of the several bars, these bars are compensated. By "compensated" is to be understood that one of a pair of bars having a common linkage is doubled. This would apply, say to bars 80, 85 where the compensating bars are distinguished as 80' and 85'.

However to allow extreme end positions to be attained, the central bars 82 and 83 cannot be treated in this manner but must be both double as indicated at 82' and 83' in Figs. 8 and 16, to permit their common linkage point to be divided into separate upper and lower parts so that in such construction there will be two pins 39 and 39', with a space therebetween to allow passage of the end linkages of the diamond when moving the parts to said extreme end positions.

The virtual line passing through the center of pins 38 and 39 is the axis of symmetry identified by reference number 114.

To pins 41 and 42 are pivoted two other bars 84 and 85 which extend towards the axis of symmetry and meet at a point materialized by a pin 40 (Figs. 7, 8 and 9) on the side of pins 39 and 39' remote from pin 38. Said pin 40 which simultaneously constitutes the pivot for both bars 84 and 85, acts as a connection for rod 43 and compensating rod 43' which are located coaxially with the axis of symmetry. Said rod 43 (being understood as comprising also rod 43') is coupled by means of pin 44 to a cam 44' mounted on lever 45. Cam 44' is provided with an actuating handle 44'' to permit a change into the position of "infinity" (after setting the working distance) by means of rotation of said cam 44' through said handle 44'' through 180°. In my copending application Serial No. 578,707 filed February 19, 1945, now issued as Patent No. 2,618,067, November 18, 1952, this conjugated lever system is explained in greater detail.

Figure 19:
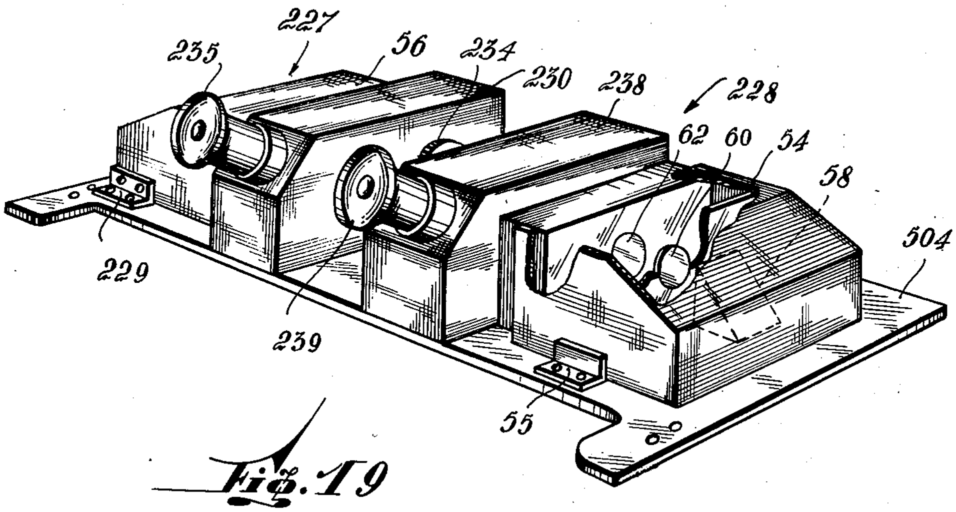
Figure 19 is a detail perspective view of the double microscope comparator.
Figure 18:
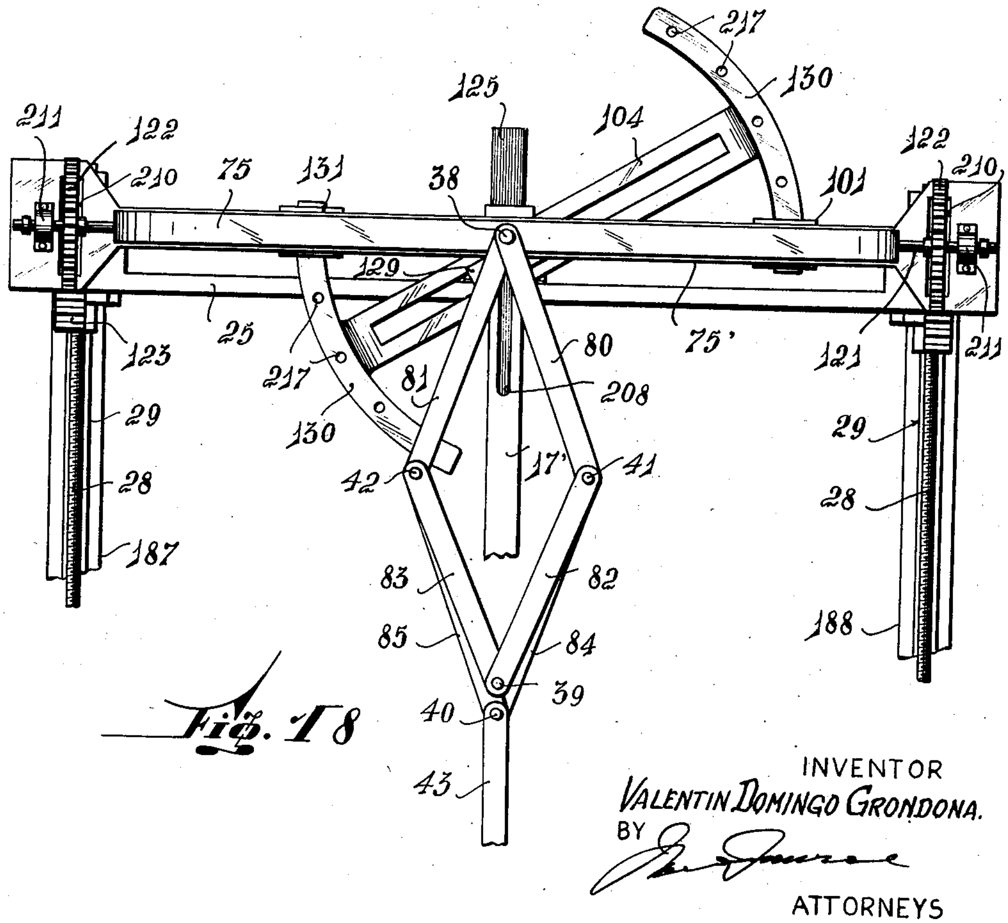
Figure 18 is a part-sectional plan view similar to that shown in Figure 9, but with some elements in different positions and other parts omitted.

Lever 45 (see Figs. 7 and 9) has its fulcrum on pin 50 and by means of the cursor 47 the said lever 45 is connected to lever 46 pivoted on pin 51 and its resistance arm 46' terminates in a fork which engages the pin 52 of the connecting rod 53, said rod being coupled to the housing 54 in which the reflecting prism 58 (see Fig. 7) and objective lens 60 are mounted. The housing 54 is slidably mounted on guide 55 (Figs. 7, 9 and 19) fixed to the bridge 504 supporting the stereoscope, so that said housing may be displaced in response to the action of connecting rod 53 which, by means of levers 46 and 45, is actuated by the inversor mechanism 506. If desired, lever 53 may be housed underneath the stereoscope so as to give the assembly a more compact structure. The lever mechanism and the optical system are mounted on bridge 504 which is supported by supports 86 (see Figs. 8 and 9).

In view of the previous explanation, it will be readily understood by those skilled in the art that upon shifting housing 54 and thereby reflecting prism 58 and objective lens 60, the parallax will be compensated and since the amount of shift is mainly controlled by levers 45, 46 and 53 and its accessories such as cursor 47, this arrangement will be hereinafter called "the stereoscopic parallax compensating means."

In order to vary the relationship existing between the transmission lever 45 and 46 which can be obtained by varying the position of cursor 47, said cursor 47 is mounted on the thread of the screw 49 (see Figs. 7, 8 and 9), which is controlled by handwheel 48. More particularly cursor 47 is provided with a pin 47′ having at its lower end an internally threaded eye (not visible) through which said screw 49 passes and threadingly engages said aforementioned pin 47′. Screw 49 is slideably supported by bearing 87 fixed to the lower side of bridge 504. By changing the position of cursor 47 with respect to lever 45 and 46, the transmission ratio is wholly changed and therefore by means of handwheel 48 the working scale of the apparatus is controlled. On the same screw 49 cursor 117 is slidably mounted; said cursor 117 being provided with a pointer or index 117′ in functional relationship with a scale 118 marked on the bridge 504 supporting the stereoscope 503, which scale indicates the working scale. Thus, both cursors 47 and 117 respond to the action of handwheel 48.

The drawing apparatus 505 (see Figs. 7, 8, 10, 16 and 17) consists of a pantograph constituted by rods 97 joined crosswise by pins 98 (see Fig. 7) and pivoted on pins 99. The pantograph, is likewise formed of a "compensated" lever system which, however, in order to facilitate the reading of the drawing, is not shown but in Figs. 8, 16 and 17.

The pantograph as shown in Fig. 7, has its pole linked to pin 16 which pin is integral with bar 515 connected to pin 39 of the inverter mechanism 506 which is as already explained, the pole. The mesh of the pantograph existing between pin 16 and pin 33 corresponds, as far as its magnitude and orientation are concerned, to the radii vector of each of the restored points of the photograms, in scale. In order to obtain a magnified restoration, between pin 33 and the pencil 35 mounted on the free end of the extensible arm forming the pantograph, three more meshes are inserted. Pencil 35 slides over paper 88 placed on the drawing board 89.

It happens however sometimes that it is not desired that the pole of the pantograph coincide with the pole of the apparatus. This happens for instance if it is desired to restore several views to be linked together at a point which does not coincide with the pole of the apparatus. Therefore, in such circumstances, as may be seen in Figs. 8, 10 and 16 which shows the other embodiment of the apparatus, the pole of the pantograph is not linked to pin 16 but to a pin 77, which may be coaxial with pin 16. Pin 77 is slidably mounted in block 77′ and upwardly spring urged by means of spring 222 housed in housing 223 attached to the lower part of block 77′. Block 77′ is slidably located in guide 79 which in turn is rotatably mounted on a graduated circle 105, the center of which coincides with the axis produced by pin 16. Thus guide 79 may move angularly with respect to circle 105 on which it can be locked by means of clamp screw 106. Block 77′ is governed by a micrometer screw 90, having a graduated handwheel 224 in indicating relationship with index 225. In order to assure a proper and exact displacement of block 77′, said block is spring urged by spring 226 in opposition to screw 90.

By displacing block 77′ radially and/or angularly the pole of the pantograph is displaced accordingly.

As already stated, bridge 25 (see Fig. 7) is provided with a scale 25′ in indicating relationship with index 201 of cursor 22, which indicates the elevations. By adjusting the cursor 22 by means of handles 24, to adopt a determined value on said scale, and by blocking the movement of handle 24, elevation curves may be directly drawn.

There is another scale 76′ arranged on bridge 76 along which the cursor 31 provided with a suitable index (not shown) slides, which cursor 31 indicates the abscissae referred to axis 114, while along the side of basic bar 187 a further scale 187′ indicates by means of index mark 30′ on sliding block 30, the ordinates referred to the pole corresponding in the simplified embodiment to pin 16 and in the other embodiment to pin 77.

The units marked on the coordinate scales with respect to the drawings, are in inverse ratio to the magnification coefficient of the pantograph.

The optical part of the apparatus comprises a stereoscope having parts 227 and 228 corresponding to each of the eyes of the operator. (See Figs. 7, 8, 9 and 19.) The part 227 of the stereoscope (see Figs. 7 and 19) comprises a housing 56 fixed to bridge 504 by means of angles 229 (only one being visible in Fig. 19). Housing 56 contains prism 57 (see Fig. 7) and projecting lens 59. Housing 56 is provided with a telescopical housing 230 which may be displaced at will in order to obtain the necessary interpupillary distance. To this end housing 230 (see Fig. 9) is provided with a projecting tube 231 and housing 238 of part 228 is provided with a similar tube 232, in which tubes a right and left hand screw-thread 233 is housed with its respective ends. Screw 233 is provided with a handwheel 234. Upon actuating handwheel 234 housing 230 will be displaced towards or from housing 54 and thereby the interpupillary distance may be conveniently changed. In housing 230 the objective lens 61 (see Fig. 7) and the prisms 63, 65 and 67 (see also Fig. 8) are arranged, whilst in tube 235 of the binocular grid 69 and the compound eyepiece 71 is arranged. In Fig. 7 as well as in Fig. 8 the ray of sight 236 is clearly shown and it may be appreciated that in order to allow that the ray of sight 236 reaches the photogram 1, mounted in the photogram support 91, bridge 504 is provided with a perforation 237 underneath prism 57.

It will be understood that by moving housing 230 with respect to housing 56 no change is introduced in the ray of sight since lenses 59 and 61 are parallel.

Part 228 is similar to part 227 and consists of two movable housings 238 and 54. Housing 54, which can be displaced along the guides 55 attached to bridge 504, encloses the reflector prism 58 and the projecting lens 60 and its movements are governed by connecting rod 53 and the lever system 45, 46 all of which are actuated by the inversor mechanism 506. Housing 238 which can be moved at will by means of handle 234 and is symmetrically disposed with respect to housing 236, likewise comprises an objective lens 62 and the prisms 64, 66 and 68. Tube 239 of the binocular, also contains a grid 70 and a compound eye piece 72. Bridge 504 is likewise provided with a perforation 240 underneath reflecting prism 58 in order to allow that the ray of sight 241 reaches the photogram 2 arranged in photogram support 92. In order to avoid dead points in the linking mechanism, housing 54 is connected to tension spring 250 (only shown in Fig. 9).

The prisms 57, 63 and 65 of part 227 and the prisms 58, 64 and 66 of part 228 constitute the well known Porro system adapted to rectify the images given by the objectives. The prisms 67 and 68 are double reflecting prisms, the purpose of which is to obtain oblique lines of sight of greater convenience to the operator.

Photogram 1 is placed in the principal focal plane of lens 59 and photogram 2 is placed in the principal focal plane of lens 60. The grid 69 is at the focus of objective 61 and grid 70 is at the focus of objective 62. In this way two permanently focused systems are obtained, even if the distances between lenses 59 and 61, and 60 and 62 are varied. Grids 69 and 70 are identical so if both are viewed simultaneously the operator has the subjective impression of a single indicator suspended above the scene photographed in relief.

In case photograms 1 and 2 are not taken at the same level, the apparatus may be provided with a suitable mechanism to compensate this difference. In Fig. 20 such an arrangement is shown. Prism 65 is mounted in a frame 242 longitudinally slidable in guide 243. As can be seen in Fig. 21, upon displacing prism 65, the ray of sight 236 is correspondingly displaced in a distance indicated by reference numeral 251 (see Fig. 21) so that in prism 63 (not shown in Fig. 20) the necessary compensation through prism 65 is performed. To this end, frame 242 is governed by lever 244 conveniently supported by bridge 504 (not shown in Fig. 20). Lever 244 on its turn is controlled by pin 245 forming the free end of screw 246 slidably supported by nut 100 also fixed on bridge 504. Screw 246 is controlled through a Bowden cable 119 arranged in support 86 (not shown in Fig. 20). The other end of said Bowden cable 119 is connected to a helical gear 120 meshing with screw 116 mounted on shaft 12. Screw 116 in turn is controlled by handwheel 115 coaxial with handwheel 13 but independent in its control function. In order to ensure the correct movement of frame 242 and prism 66, said frame is spring urged by spring 102 as may be seen in Fig. 20.

The several organs have means tending to suppress instrument errors. The eye-pieces independently focus each grid. The projecting lenses 59 and 60 permit of individual displacement so as to adjust the focusing of the photograms 1 and 2.

Photograms 1 and 2 (see Fig. 22) are seated in photogram supports 91 and 92 which allow them to be suitably and correctly adjusted as will be later on explained.

The assembly constituted by a photogram, the projecting lens, the objective lens and the eyepiece constitutes, in each part of the stereoscope, an "afocal" system which is also called a "telescopic" system.

The movements of platform 501 although shown as taking place on rails, may be obtained by means of sliding guides, a system of pivoted quadrilateral links or in any other known way. All the sliders carry register members in order to suppress lateral play, and screws and gears are provided with devices for eliminating dead centers.

The apparatus described is adaptable to any drawing board, since by means of its feet 107 (see Figs. 8, 9, 10 and 14) provided with leveling screws 252 it may rest on any table 108, and by means of the knobs 109 it rests on the drawing board 89. A spirit level (not shown) may be arranged in any suitable part on the apparatus so as to facilitate the correct leveling by means of leveling screw 252.

In the lower portion of the apparatus, the frame 502 has a stop 110 to define the position of the stereophotogrammetrical restorer with respect to the edge of the drawing board 89.

As may be seen in Figs. 8 and 16 the main part of the transmission and inversor mechanism is covered by a protecting member 111.

In order to obtain luminosity in the photograms 1 and 2, which are transparent plates, a set of light sources 253 fitted with the corresponding reflector 248, is located in the lower part of the base frame 502 (see Fig. 8).

Theoretically, the utilization of a pantograph in combination with the stereophotogrammetric restorer according to the invention is not indispensable. However, the use of the pantograph allows of the construction of an apparatus of considerably reduced size with the ensuing advantages and without affecting the precision of the work.

It is to be noted that the restorer of the present invention has been so conceived that those parts involving high accuracy in finish or operation may be designed as relatively light parts whereas other parts whose function call principally for strength and ruggedness, may be designed with more liberal tolerances.

OPERATION WITH THE STEREOPHOTOGRAMMETRIC RESTORER

*(a) Setting of the apparatus*

In first instance the photograms 1 and 2 are set in the photogram supports 91 and 92 respectively, in which they are firmly held in proper position by the combined action of the leaf spring 249 of groove 154 and the inclined face of groove 155. The notches 250 (Figs. 11 and 22) facilitate the introduction of a finger under the edge of the corresponding photogram in order to remove the same if so desired.

Once the photograms 1 and 2 are placed in their respective frames 91 and 92, the operator must separately focus the grids 69 and 70 in accordance with his eye-sight, and immediately thereafter must adjust the interpupillar distance by means of handwheel 234. The interpupillar adjustment is to be considered as the second adjustment.

The third adjustment consists in placing the horizontal platform or carriage 501 in its mean position by turning handwheels 24 and 13 to such an extent until bar 17 and arm 20′ remain parallel to the axis of symmetry 114.

The fourth adjustment is the correct setting of slideway 104. This setting comprises two operations the first of which has already been explained and refers to the calculation of the distance existing between pin 38 and point 78 by means of the previous explained formula and consequent displacement or setting of cursors 101 and 131. The second operation consists in adjusting the slideway 104 in accordance with the angle which the base forms with the photograms, in other words, by setting the graduated sectors 130 of slideway 104. To facilitate the understanding of the drawings, especially the interrelationship thereof, in Fig. 18 the front part of Fig. 9 is shown, but with the different parts and elements displaced in accordance with the position shown in Fig. 8.

The fifth and last adjustment is the adjustment of the working scale calculated by means of Formula 10 which depends on the values of the base and inclination angle of the photograms. The corresponding adjustment is effected in the apparatus by turning handwheel 48 in such a manner as to bring index 117′ of cursor 117 opposite the desired value of the working scale 118.

Once these adjustments have been carried out, the photograms 1 and 2 have to be adjusted in their respective frames 91 and 92, with regard to the stereoscope 503. To this end, in first instance blocks 30 with all the bridges must be displaced by means of handwheels 36 to their fullest extent, delimited by the maximum value which the main diagonal (determined by the segment included between pins 38 and 39) of the inversor mechanism 506 may take. Afterwards the handle 44″ is actuated so as to move cam 44′ through half a turn around pin 44, thus virtually shortening the length of the connecting rod 43 in order to overcome the discontinuity between the maximum working distance and the "infinity."

Figure 22:
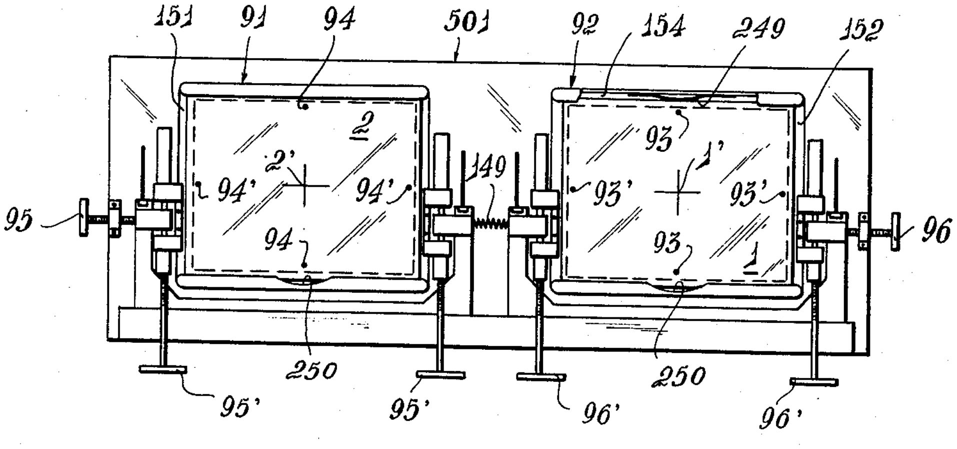
Figure 22 is a detail plan view of the photogram supports with photograms mounted therein.

When these operations have been completed, the stereoscope comparator 503 is ready for adjusting in combination with the adjustment screws 95, 95′, 96 and 96′ the photograms 1 and 2. Photograms 1 and 2 have been separately shown in Fig. 22 in order to avoid overburdening the other figures. Fig. 22 corresponds to Fig. 11 but several parts have been eliminated for convenience of the drawing. Photograms 1 and 2, as usual, show on their plates the respective index points 93 and 94 for the vertical alinement and 93′ and 94′ for the horizontal alinement. The virtual centers 1′ and 2′ of the photograms 1 and 2, respectively, are defined by the intersections of the imaginary cross lines determined by points 93 and 93′ as well as 94 and 94′. These intersections 1′ and 2′ must coincide with the respective grids 69 and 70 of the stereoscope 503. To this end each of the photograms 1 and 2 is adjusted independently by observing for photogram 1 the latter through eyepiece 71, and by observing photogram 2 through eyepiece 72.

The adjustment of each of the photograms is carried out as follows. The horizontal platform 501 is displaced along the axis of abscissae by turning handwheel 13 and thereby displacing cursor 10 and rod 9 linked to said platform 501 until, for instance when adjusting photogram 1, one of the points 93′ appears in the field of grid 69. If the point or mark 93′ does not coincide exactly with the grid, then frame 152 is displaced by means of handwheels 96 and 96′ until said desired coincidence is obtained. Thereafter by actuating handwheel 13 platform 501 is again displaced along the axis of abscissae until the other point or mark 93′ of the photogram 1 appears under the field of grid 69 and if necessary a second adjustment in order to obtain the coincidence is carried out.

Thereafter the horizontal platform 501 is displaced along the axis of ordinates by actuating handwheel 24 which moves cursor 22 and cursor 22′ which acts upon the right angle lever 20—20′ and which in turn through block 18 and pin 19 displaces bars 5 longitudinally along the axis of ordinates and thereby also through rails 3 and wheels 171, platform 501. Points or marks 93 are adjusted in a similar way as marks 93′. Thereby photogram 1 will have been correctly set, that is to say that the intersection 1′ will coincide in the mean position with grid 69.

A similar adjustment is made with regard to photogram 2 and which will not be separately described.

Once the centering of the photograms has been achieved, the cam 44′ is turned back to the working position by means of handle 44″, and then the several points of the photographed terrain are scanned by means of the coincidence with the stereoscopic mark by observing through both eye pieces 71 and 72 and using handwheels 13, 24 and 36 in order to displace the virtual floating stereoscopic mark formed of the grids 69 and 70, accordingly.

As already explained, handwheel 13 controls the azimuth, handwheel 36 the distance and handwheel 24 the elevation.

(b) *Functioning of the apparatus*

When the operator observes the terrain through the stereoscope 503, he will see the landscape in a stereoscopical view, and floating above it a virtual mark, which he can control at will, i. e. he can displace it in distance, height and elevation. By positioning said floating mark over the points he desires to restore, the writing point 35 will carry out a similar movement over the paper 88 on the drawing board 89 and draw the map in a predetermined scale.

In order to facilitate the understanding of the working of the apparatus, the movement of each of the parts upon actuating either of handwheels 13, 24 and 36 will now be separately described.

Handwheel 13, by means of screw 12, causes displacement of cursor 10 which by means of bar 9 causes platform 501 to move along the axis of abscissae and, at the same time, by means of pin 14, cursor 10 in combination with cursors 11 acts as a thrust on double bar 17 which is pivoted on pin 16 and moves angularly to control the drawing apparatus 505 in azimuth since by means of pin 33 said bar 17 is operatively associated with the drawing apparatus 505 in the form of a pantograph. Movement of bar 17 is accompanied by movement of bar 17′ which is rigidly connected to it and superposed with respect thereto. Movement of bar 17′ causes displacement of pivot pin 127 which, acting on the double cursor 126 in conjunction with guide 125, cursor 129 and inclined slideway 104 causes relative displacement of bridges 75, 75′ and 25 in direction of the axis of symmetry 114 as hereinbefore described.

Handwheel 24, by means of screw spindle 23 actuates cursor 22 whose block 22′ is associated with arm 20′ of the right angle lever. Arm 20 of said lever is connected to block 18 which, by means of pin 19 is associated with fork 19', so that upon actuating handwheel 24 the right angle lever causes the frame formed by bars 5 and rails 3 to move along the axis of ordinates on the rollers 6 and 7 which carry said bars 5, and on the other hand displacing thereby the horizontal platform 501 in the same direction.

The elevation is indicated by scale 25' and index 22' and is read in combination with a table in which said indications of said scale 25 are given in relationship with the working scale used. The elevations are not registered by the drawing apparatus 505 when plane survey maps are being restored.

Handwheel 36 causes by means of gears 37 and 37' the rotation of screws 28 and thereby the displacement of blocks 30 which with their columns 103 support bridges 76, 26, 25, 75' and 75. As has already been stated, bridge 75 engages the end of inversor mechanism 506 through pin 38 so that the movements of handwheel 36 are reflected on pin 40 of the invertor mechanism 506, whereby link 43 and the conjugated lever system 45 and 46 and thereby connecting rod 53, act on housing 54 which, with the reflector prism 58 and lens 60 is displaced between guides 55 in order to compensate the parallaxes.

Obviously by displacing blocks 30, bridge 76 is also displaced and thereby pin 33 varies its position with respect to pin 16 so that the writing point 35 of the drawing apparatus 505 is moved in distance.

With regard to the simplified embodiment the operations are exactly the same and therefore do not require any further explanation, since it will be understood by those skilled in the art, that when using coplanar plates, the second bar 17' and the corresponding bridges and cursors are unnecessary.

I claim:

1. A stereophotogrammetric restorer for restoring surveyed fields comprising a stereoscope provided with a stereoscopic photogram carrying platform having manually operable means for effecting movements of the platform in two orthogonal directions in a plane, stereoscopic parallax compensator means, a link mechanism coupled between said compensator means and said manually operable means and including a Peaucellier's diamond for proportionally inverting the movements of said compensator means with regard to the movements of said manually operable means, and a drawing apparatus operatively connected to said manually operable means.

2. A stereophotogrammetric restorer for restoring surveyed fields comprising a stereoscope provided with a stereoscopic photogram carrying platform having manually operable means for effecting movements of the platform in two orthogonal directions in a plane, stereoscopic parallax compensator means, a link mechanism including an inversor mechanism, a coupling connecting said compensator means to said link mechanism, said compensator means including a first lever, said first lever being connected to said link mechanism, a second lever adjustably coupled to said first lever, and a rod linked to said stereoscope, said rod being coupled to said second lever, and a drawing apparatus connected to said link mechanism for drawing the surveyed field to be restored.

3. A stereophotogrammetric restorer for restoring surveyed fields comprising a stereoscope provided with a stereoscopic photogram carrying platform having manually operable means for effecting movements of the platform in two orthogonal directions in a plane, stereoscopic parallax compensator means, a link mechanism including an inversor mechanism, a coupling connecting said compensator means to said link mechanism, said compensator means including a first lever and a second lever, said first lever being connected to the link mechanism, a first cursor adjustably coupling said second lever to said first lever, a second cursor, a working scale on said platform for indicating the scale under which said restorer operates, said second cursor being operatively associated with said first cursor and comprising an index cooperating with said working scale, a rod linked to said stereoscope and coupled to said second lever, and a drawing apparatus connected to said link mechanism for drawing the surveyed field to be restored.

4. A stereophotogrammetric restorer for restoring surveyed fields comprising a stereoscope provided with a stereoscopic photogram carrying platform having manually operable means for effecting movements of the platform in two orthogonal directions in a plane, stereoscopic parallax compensator means, a link mechanism including a Peaucellier's diamond, said compensator means including a first lever and a second lever, a coupling connecting said first lever to said second lever and being adjustable lengthwise of said levers, a pivotal connection connecting said first lever to said link mechanism, said pivotal connection being in the form of a cam constituting a change over device for changing the setting of the apparatus from "working" distance to "infinity," a rod coupled to said second lever and linked to said stereoscope, and a drawing apparatus connected to said link mechanism for drawing the surveyed field to be restored.

5. A stereophotogrammetric restorer for restoring surveyed fields having an axis of symmetry and comprising a stereoscope provided with a stereoscopic photogram carrying platform having manually operable means for effecting movements of the platform in two orthogonal directions in a plane, stereoscopic parallax compensator means, a link mechanism coupled to said compensator means and comprising a system of pivoted links similar to Peaucellier's diamond and defining a collapsible rhombus having adjustable angles, a main diagonal and a secondary diagonal, a pair of additional links, each connected to the vertex of one of the angles corresponding to the secondary diagonal, said additional links extending towards the axis of symmetry and meeting at a point outside of the rhombus and on the main diagonal, said link mechanism being operatively connected to said manually operable means, and a drawing apparatus operatively connected to said link mechanism for drawing the surveyed field to be restored.

6. A stereophotogrammetric restorer for restoring surveyed fields having an axis of symmetry, a frame and a stereoscope provided with a stereoscopic photogram carrying platform having manually operable means for effecting movements of the platform in two orthogonal directions in a plane, stereoscopic parallax compensator means, a link mechanism coupled to said compensator means, said link mechanism comprising a system of pivoted links defining a collapsible rhombus having a main diagonal and a secondary diagonal and including a first pivot vertex coinciding with one end of the main diagonal, a second pivot vertex coinciding with the other end of said main diagonal, and third and fourth pivot vertices coinciding with the ends of said secondary diagonal, a support supporting said first pivot vertex, said support operatively connected with said manually operable means, a drawing apparatus coupled to said second pivot vertex for drawing the surveyed field to be restored, a pair of additional links connected to said third and fourth vertices and meeting at a point on the side of said second pivot vertex remote from said first pivot vertex, said meeting point being coupled to said compensator means.

7. A stereophotogrammetric restorer for restoring surveyed fields comprising a slideably movable housing, a two part stereoscope located in said housing and having an optical system including a reflecting prism and a projecting lens and an objective lens and a system of rectifying prisms for each of the two parts of the stereoscope, said parts including corresponding eyepieces and respective grids, said stereoscope being provided with a stereoscopic photogram carrying platform, a pair of photogram supports on said platform, manually operable means for effecting movements of the platform in two orthogonal directions in a plane, adjustment means for adjusting said photogram supports, movable stereoscopic parallax compensator means, a link mechanism coupled to said compensator means, a drawing apparatus operatively connected to said link mechanism for drawing the surveyed field to be restored, said compensator means being operatively connected with one of said objective lenses.

8. A stereophotogrammetric restorer for restoring surveyed fields comprising a stereoscope consisting of a first housing, a second housing, a third housing and a fourth housing, said first housing being telescopically linked to said second housing and said third housing being telescopically linked to said fourth housing, said first and third housing being slideably linked together for varying the distance between said first and third housing, said first and third housing each comprising an eye-piece, a grid, a system of rectifying prisms and an objective lens, said second and fourth housing each comprising a projecting lens in alinement with said objective lenses of the respective first and third housing and furthermore comprising a reflecting prism, a frame, a bridge rigidly fastened to said frame, said first, third and fourth housings being slideably mounted on said bridge, and said second housing secured to said bridge, a stereoscope photogram carrying platform located below said bridge, manually operable means for effecting movements of said platform in two orthogonal directions in a plane, a pair of photogram-supports mounted on said platform, said reflecting prisms facing said photogram-supports, a connecting means linked to said fourth housing, a link mechanism, said connecting means being also linked to said link mechanism, said fourth housing being position controlled by said connecting means, said fourth housing and connecting means constituting a parallax compensator means, said link mechanism being operatively connected to said manually operable means, and a drawing apparatus operatively connected to said link mechanism for drawing the surveyed field to be restored.

9. A stereophotogrammetric restorer comprising a base frame, a stereoscope, a first bridge supported by said base frame and supporting said stereoscope, a horizontal stereoscopic photogram carrying platform located below said first bridge and including supporting rollers, a first manually operable means for effecting movements of said platform along and parallel to a first direction, and a second manually operable means for moving said platform along and parallel to a second direction perpendicular to said first direction, said first manually operable means comprising a first manually controlled screw spindle arranged parallel to the axis of abscissae and rotatably supported by said base frame, a first cursor slideably mounted on said first screw spindle and provided with an outstanding rod, having a free end coupled to said horizontal stereoscopic photogram carrying platform, said second manually operable means comprising a second manually controlled screw spindle arranged parallel to said first direction, a second bridge rotatably supporting said second screw spindle and slideably mounted on the base frame for movement in said second direction, manually controlled driving means for controlling the displacement of said second bridge, a second cursor slideably mounted on said second screw spindle, a right angle lever including a first arm and a second arm, said first arm having a free end slideably engaging said second cursor, a first bar and a second bar, a pair of parallel rails connecting said first and second bars in parallel spaced relationship, said rails being perpendicular to said bars, said first and second bars being slideably supported by said base frame and extending in said second direction, said second arm having a free end portion slideably engaging said first bar, said supporting rollers engaging said rails to permit translation of said platform along said rails, a link mechanism, stereoscopic parallax compensator means, a drawing apparatus, said link mechanism being coupled to said stereoscopic parallax compensator means and to said second bridge as well as to said drawing apparatus.

10. A stereophotogrammetric restorer comprising a base frame, a stereoscope, a first bridge supported by said base frame and supporting said stereoscope, a horizontal stereoscopic photogram carrying platform located below said first bridge, a first and a second manually operable means operatively associated with said platform for moving said platform in two orthogonal directions in a plane, stereoscopic parallax compensator means coupled to said stereoscope, a link mechanism coupled to said compensator means and operatively connected to said first and second manually operable means and comprising a system of pivoted links forming a collapsible rhombus, including vertices defined respectively by a first pivot pin, a second pivot pin, a third pivot pin and a fourth pivot pin, a second bridge slideably mounted on said base frame, a third bridge fixed to said base frame, said first pivot pin being coupled to said second bridge and said third pivot pin being connected to said thrid bridge, a pair of additional links of equal length, a fifth pivot pin pivotally coupling together said additional links at one of their ends, the other end of said additional links being connected respectively to said second and fourth pivot pins, said fifth pivot pin being located on the side of said third pivot pin remote from said first pivot pin and being connected to said movable stereoscopic parallax compensator means, a polar pantograph comprising a plurality of articulated meshes, including a first mesh, having an inner free end defining a pole, and located coaxially with said third pin and an operating point for said pantograph consisting of a sixth pin positioned at the end of said first mesh opposite said inner end, a fourth bridge in parallel spaced relationship with said second bridge, said sixth pin being slideably arranged on said fourth bridge manually controlled driving means for controlling the displacement of said fourth bridge, a first cursor mounted on said sixth pin, a second cursor connected to said platform, and also connected to be controlled by said first manually operable means, a first bar having one end slideably arranged in said first cursor and another end slideably mounted on said second cursor, and a fulcrum coaxial with said third pin, a second bar having a first portion fixed to said first bar and a second portion parallel to and vertically spaced from said first bar, said second portion having a free end and a fulcrum coaxial with said third pin and spaced from the fulcrum of said first bar, a third cursor slideably supported by said second bridge and arranged in motion transmitting relationship with said free end of said second portion, an angularly adjustable slideway supported by said second bar and in operative relationship with said third cursor, a fifth bridge fixedly secured to and located in the same vertical plane as said fourth bridge, said fifth bridge carrying said second manually operable means.

11. A stereophotogrammetric restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, a transverse bar linking said two basic bars, two upstanding supports each fixed to a respective basic bar in parallel relationship to said plane of symmetry, said basic bars supporting substantially the several parts of the apparatus, a stereoscopic photogram carrying platform parallel to said first bridge and including rollers, a first manually operable means for moving said platform perpendicularly to the plane of symmetry, a second manually operable means for moving said platform parallel to said plane of symmetry and to said second plane, said first manually operable means comprising a first screw spindle supported by said basic bars perpendicularly to said plane of symmetry, a first cursor slideably mounted on said first screw spindle, a first rod constituting a driving connection between said first cursor and said platform, a hand wheel for turning said first screw spindle, a first column and a second column slideably mounted one on each basic bar, a second bridge, a third bridge, a fourth bridge, a fifth bridge and a sixth bridge supported by said first and second columns, a third column and a fourth column mounted on said transverse bar and adjacent said two basic bars, said third and fourth columns also supporting said first bridge, a seventh bridge and an eighth bridge supported by said third and fourth columns, a second and third manually controlled coupled screw spindles connected to said first and second columns for controlling the position thereof, a second cursor rotatably mounted on said first cursor, a third cursor slideably mounted on said second bridge and provided with a second rod, a fourth cursor and a fifth cursor rotatably supported by said second rod, said fifth cursor being slideable along said third bridge, a first bar having one end portion slideably mounted on said second cursor and another end portion slideably mounted on said fourth cursor, a first pin pivotally supported by said seventh and eighth bridges, said first bar being pivoted to said first pin, a polar pantograph comprising a plurality of articulated meshes and having a pole, an actuating point coupled to said second rod and a writing point, a first block, a second pin coupled to said pole, a graduated circular member mounted on said transverse bar, a guide rotatably mounted on said circular member, said first block being rectilinearly displaceable in said guide, said first block constituting a housing for said second pin, said second manually operable means comprising a fourth screw spindle provided with a hand-wheel for manual control and supported by said first and second columns below said fourth bridge and above said third bridge, a sixth cursor mounted on said fourth screw spindle and displaceable along said fourth bridge, a seventh cursor pivotally linked to said sixth cursor and displaceable along said third bridge, a right angle lever having a first arm and a second arm, a second block linking said first arm to said second arm, said second block being rotatably supported by said first pin, said first arm passing through said seventh cursor, supporting bars slideably supported by and arranged parallel to each of said upstanding supports and disposed substantially parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second arm of said right angle lever being coupled to one of said supporting bars, a stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said sixth bridge and said second pivot pin being connected to said first bridge and coaxial with said first pin, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means, a second bar having a first portion fixed to said first bar and a second portion parallel to and vertically spaced from said first bar, said second portion having a free end and a fulcrum connected to said first bridge and coaxial with said first pin, an eighth cursor arranged in motion transmitting relationship with said free end and slideably supported by said fifth bridge, an angularly adjustable slideway in operative relationship with said eighth cursor and supported by said fifth bridge and a ninth cursor slideably connected to said fourth bridge and in operative relationship with said eighth cursor.

12. A stereophotogrammetric restorer for enabling surveyed fields to be restored comprising a stereoscope provided with a stereoscopic photogram carrying platform having manually operable means for effecting movements of the platform in two orthogonal directions in a plane, stereoscopic parallax compensator means, a link mechanism coupled between said compensator means and said manually operable means and including a Peaucellier's diamond for proportionally inverting the movement of said compensator means with regard to the movements of said manually operable means and measurement indicating means operatively connected to said manually operable means.

13. A stereophotogrammetric restorer comprising a first bridge, a stereoscope mounted on said first bridge, a base frame supporting said first bridge and having two parallel basic bars spaced from each other, a transverse bar linking said two basic bars, two upstanding supports each fixed to a respective basic bar, said basic bars supporting substantially the several parts of the apparatus, a stereoscopic photogram carrying platform parallel to said first bridge and including rollers, a first manually operable means for moving said platform rectilinearly, a second manually operable means for moving said platform along a path perpendicularly to the path the first manually operable means may impart to said platform, said first manually operable means comprising a first screw spindle supported by said basic bars, a first cursor slideably mounted on said first screw spindle, a first rod constituting a driving connection between said first cursor and said platform, a hand wheel for turning said first screw spindle, a first column and a second column slideably mounted one on each basic bar, a second bridge, a third bridge, a fourth bridge, a fifth bridge and a sixth bridge supported by said first and second columns, a third column and a fourth column mounted on said transverse bar and adjacent said two basic bars, said third and fourth columns also supporting said first bridge, a seventh bridge and an eighth bridge supported by said third and four columns, a second and third manually controlled coupled screw spindle connected to said first and second columns for controlling the position thereof, a second cursor rotatably mounted on said first cursor, a third cursor slideably mounted on said second bridge and provided with a second rod, a fourth cursor and a fifth cursor rotatably supported by said second rod, said fifth cursor being slideable along said third bridge, a first bar having one end portion slideably mounted on said second cursor and another end portion slideably mounted on said fourth cursor, a first pin pivotally supported by said seventh and eighth bridges, said first bar being pivoted to said first pin, a polar pantograph comprising a plurality of articulated meshes and having a pole, an actuating point coupled to said second rod and a writing point, a first block, a second pin coupled to said pole, a graduated circular member mounted on said transverse bar, a guide rotatably mounted on said circular member, said first block being rectilinearly displaceable in said guide, said first block constituting a housing for said second pin, said second manually operable means comprising a fourth screw spindle provided with a hand-wheel for manual control and supported by said first and second columns below said fourth bridge and above said third bridge, a sixth cursor mounted on said fourth screw spindle and displaceable along said fourth bridge, a seventh cursor pivotally linked to said sixth cursor and displaceable along said third bridge, a right angle lever having a first arm and a second arm, a second block linking said first arm to said second arm, said second block being rotatably supported by said first pin, said first arm passing through said seventh cursor, supporting bars slideably supported by and arranged parallel to each of said upstanding supports and disposed substantally parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second arm of said right angle lever being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said sixth bridge and said second pivot pin being connected to said first bridge and coaxial with said first pin, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means, a second bar having a first portion fixed to said first bar and a second portion parallel to and vertically spaced from said first bar, said second portion having a free end and a fulcrum connected to said first bridge and coaxial with said first pin, an eighth cursor arranged in motion transmitting relationship with said free end and slideably supported by said fifth bridge, an angularly adjustable slideway in operative relationship with said eighth cursor and supported by said fifth bridge and a ninth cursor slideably connected to said fourth bridge and in operative relationship with said eighth cursor.

14. A stereophotogrammetric restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, two upstanding supports each fixed to a respective basic bar in parallel relationship to said plane of symmetry, said basic bars supporting substantially the several parts of the apparatus, a stereoscopic photogram carrying platform parallel to said first bridge and including rollers, a first manually operable means for moving said platform perpendicularly to the plane of symmetry, a second manually operable means for moving said platform parallel to said plane of symmetry and to said second plane, said first manually operable means comprising a first screw spindle supported by said basic bars perpendicularly to said plane of symmetry, a first cursor slideably mounted on said first screw spindle, a first rod constituting a driving connection between said first cursor and said platform, a hand wheel for turning said first screw spindle, a first column and a second column slideably mounted one on each basic bar, a second bridge, a third bridge, a fourth bridge, a fifth bridge and a sixth bridge supported by said first and second columns, a third column and a fourth column mounted on said transverse bar and adjacent said two basic bars, said third and fourth columns also supporting said first bridge, a seventh bridge, and an eighth bridge supported by said third and fourth columns, a second and third manually controlled coupled screw spindles connected to said first and second columns for controlling the position thereof, a second cursor rotatably mounted on said first cursor, a third cursor slideably mounted on said second bridge and provided with a second rod, a fourth cursor and a fifth cursor rotatably supported by said second rod, said fifth cursor being slideable along said third bridge, a first bar having one end portion slideably mounted in said second cursor and another end portion slideably mounted in said fourth cursor, a first pin pivotally supported by said seventh and eighth bridges, said first bar being pivoted to said first pin, said second manually operable means comprising a fourth screw spindle provided with a hand-wheel for manual control and supported by said first and second columns below said fourth bridge and above said third bridge, a sixth cursor mounted on said fourth screw spindle and displaceable along said fourth bridge, a seventh cursor pivotally linked to said sixth cursor and displaceable along said third bridge, a right angle lever having a first arm and a second arm, a second block linking said first arm to said second arm, said second block being rotatably supported by said first pin, said first arm passing through said seventh cursor, supporting bars slideably supported by and arranged parallel to each of said upstanding supports and disposed substantially parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second arm of said right angle lever being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said sixth bridge and said second pivot pin being connected to said first bridge and coaxial with said first pin, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means, a second bar having a first portion fixed to said first bar and a second portion parallel to and vertically spaced from said first bar, said second portion having a free end and a fulcrum connected to said first bridge and coaxial with said first pin, an eighth cursor arranged in motion transmitting relationship with said free end and slideably supported by said fifth bridge, an angularly adjustable slideway in operative relationship with said eighth cursor and supported by said fifth bridge and a ninth cursor slideably connected to said fourth bridge and in operative relationship with said eighth cursor, and measurement indicating means operatively connected to said first and second manually operable means.

15. A stereophotogrammetric restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, two upstanding supports each fixed to a respective basic bar in parallel relationship to said plane of symmetry, said basic bars supporting substantially the several parts of the apparatus, a stereoscopic photogram carrying platform parallel to said first bridge and including rollers, a first manually operable means for moving said platform perpendicularly to the plane of symmetry, a second manually operable means for moving said platform parallel to said plane of symmetry and to said second plane, said first manually operable means comprising first manually controlled screw spindle supported by said basic bars perpendicularly to said plane of symmetry, a first cursor slideably mounted on said first screw spindle and in structural relationship with said platform, a first block and a second block slideably mounted one on each basic bar, a second bridge and a third bridge supported by said first and second blocks, a fourth bridge supported by said third bridge, a column mounted on said third bridge, a second and third manually controlled coupled screw spindles connected to said first and second blocks for controlling the position thereof, a second cursor rotatably mounted on said first cursor, a third cursor slideably mounted on said second bridge, a fourth cursor rotatably mounted on said third cursor, a bar having one end portion slideably mounted on said second cursor and another end portion slideably mounted on said fourth cursor, a shaft, said bar being pivoted to said shaft, a polar pantograph comprising a plurality of articulated meshes and having a pole coupled to said shaft, an actuating point coupled to said third cursor and a writing point, supporting bars slideably supported by and arranged parallel to each of said upstanding supports and disposed substantially parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second manually operable means being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said column and said second pivot pin being connected to said shaft, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means.

16. A stereophotogrammetric restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, two upstanding supports each fixed to a respective basic bar in parallel relationship to said plane of symmetry, said basic bars supporting substantially the several parts of the apparatus, a stereoscopic photogram carrying platform parallel to said first bridge and including rollers, a first manually operable means for moving said platform perpendicularly to the plane of symmetry, a second manually operable means for moving said platform parallel to said plane of symmetry and to said second plane, said first manually operable means comprising a first manually controlled screw spindle supported by said basic bars perpendicularly to said plane of symmetry, a first cursor slideably mounted on said first screw spindle, a first rod constituting a driving connection between said first cursor and said platform, a hand wheel for turning said first screw spindle, a first block and a second block slideably mounted one on each basic bar, a second bridge and a third bridge supported by said first and second blocks, a fourth bridge supported by said third bridge, a column mounted on said third bridge, a second and third manually controlled coupled screw spindle connected to said first and second blocks for controlling the position thereof, a second cursor rotatably mounted on said first cursor, a third cursor slideably mounted on said second bridge, a fourth cursor rotatably supported by said third cursor, a bar having one end portion slideably mounted on said second cursor and another end portion slideably mounted on said fourth cursor, a shaft, said bar being pivoted to said shaft, a polar pantograph comprising a plurality of articulated meshes and having a pole coupled to said shaft, an actuating point coupled to said third cursor and a writing point, said second manually operable means comprising a manually controlled fourth screw spindle supported by said fourth bridge, a fifth cursor mounted on said fourth screw spindle and displaceable along said fourth bridge, a sixth cursor pivotally linked to said fifth cursor and displaceable along said third bridge, a right angle lever having a first arm and a second arm, a third block linking said first arm to said second arm, said third block being rotatably supported by said shaft, said first arm passing through said sixth cursor, supporting bars slideably supported by and arranged parallel to each of said upstanding supports and disposed substantially parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second arm of said right angle lever being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said column and said second pivot pin being connected to said shaft, a pair of additional links of equal length, a fifth pivot pin pivotally coupling together said additional links at one of their ends, the other ends of said additional links beng connected respectively to said third and fourth pivot pins, said fifth pivot pin being located on the side of said second pivot pin remote from said first pivot pin and being connected to said compensator means.

17. A stereophotogrammetric restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, two upstanding supports each fixed to a respective basic bar in parallel relationship to said plane of symmetry, said basic bars supporting substantially the several parts of the apparatus, a stereoscopic photogram carrying platform parallel to said first bridge and including rollers, a first manually operable means for moving said platform perpendicularly to the plane of symmetry, a second manually operable means for moving said platform parallel to said plane of symmetry and to said second plane, supporting bars slideably supported by and arranged parallel to each of said upstanding supports and disposed substantially parallel to said platform for indirectly supporting the platform, a pair of parallel spaced rails perpendicular to said plane of symmetry, extending perpendicularly between and coupling together said supporting bars, said rollers engaging said rails to permit translation of said platform along said rails, said second manually operable means being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said first manually operable means and said second pivot pin being connected to said first bridge, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means, and measurement indicat-ing means operatively connected to said first and second manually operable means.

18. A stereophotogrammetic restorer comprising a first bridge, a stereoscope mounted on said first bridge and including a left eye-piece and a right eye-piece located on either side of an axis of symmetry contained in a plane of symmetry perpendicular to said first bridge, a base frame supporting said first bridge and having two parallel basic bars spaced from each other and parallel to said plane of symmetry, said basic bars defining a second plane perpendicular to said plane of symmetry, a transverse bar linking said two basic bars, two upstanding supports each fixed to a respective basic bar in parallel relationship to said plane of symmetry, said basic bars supporting substantially the several parts of the apparatus, a stereoscopic photogram carrying platform parallel to said first bridge and including supporting rollers, a first manually operable means for moving said platform perpendicularly to the plane of symmetry, a second manually operable means for moving said platform parallel to said plane of symmetry and to said second plane, said first manually operable means comprising a first screw spindle supported by said basic bars perpendicularly to said plane of symmetry, a first cursor slideably mounted on said first screw spindle, a first rod constituting a driving connection between said first cursor and said platform, a hand wheel for turning said first screw spindle, a first column and a second column slideably mounted one on each basic bar, a second bridge, a third bridge, a fourth bridge, a fifth bridge and a sixth bridge supported by said first and second columns, a third column and a fourth column mounted on said transverse bar and ajacent said two basic bars, said third and fourth columns also supporting said first bridge, a seventh bridge and an eighth bridge supported by said third and fourth columns, a second and third manually controlled coupled screw spindle sonnected to said first and second columns for controlling the position thereof, a second cursor rotatably mounted on said first cursor, a third cursor slideably mounted on said second bridge and provided with a second rod, a fourth cursor and a fifth cursor rotatably supported by said second rod, said fifth cursor being slideable along said third bridge, a first bar having one end portion slideably mounted on said second cursor and another end portion slideably mounted on said fourth cursor, a first pin pivotally supported by said seventh and eighth bridges, said first bar being pivoted to said first pin, a polar pantograph comprising a plurality of articulated meshes and having a pole, an actuating point coupled to said second rod and a writing point, a first block, a second pin coupled to said pole, a graduated circular member mounted on said transverse bar, a guide rotatably mounted on said circular member, said first block being rectilinearly displaceable in said guide, said first block constituting a housing for said second pin, said second manually operable means comprising a fourth screw spindle provided with a hand-wheel for manual control and supported by said first and second columns below said fourth bridge and above said third bridge, a sixth cursor mounted on said fourth screw spindle and displaceable along said fourth bridge, a seventh cursor pivotally linked to said sixth cursor and displaceable along said third bridge, a right angle lever having a first arm and a second arm, a second block linking said first arm to said second arm, said second block being rotatably supported by said first pin, said first arm passing through said seventh cursor, a pair of supporting bars each having a front end portion and a rear end portion, said supporting bars being parallelly arranged to each of said upstanding supports and disposed substantially parallel to said platform for indirectly supporting said platform, a pair of rollers supported by said upstanding supports, said front end portions of said supporting bars being slideably mounted on said pair of rollers, a pair of linked trestles, each formed by a plurality of articulated bars and each having a first pivot and a second pivot, said first pivots supporting said trestles and being mounted on said base frame, said second pivots pivotally engaging said rear end portions of said supporting bars, a pair of parallel spaced rails perpendicular to said plane of symmetry, extending perpendicularly between and coupling together said supporting bars, said supporting rollers engaging said rails to permit translation of said platform along said rails, said second arm of said right angle lever being coupled to one of said supporting bars, stereoscopic parallax compensator means coupled to said stereoscope, a link mechanism coupled to said compensator means and comprising a system of pivoted links defining a collapsible rhombus including vertices defined respectively by a first pivot pin, a second pivot pin, a third pivot pin and a fourth pivot pin, said first pivot pin being coupled to said sixth bridge and said second pivot pin being connected to said first bridge and coaxial with said first pin, a pair of additional links of equal length, a fifth pivot pin pivotally coupling together said additional links at one of their ends, the other ends of said additional links being connected respectively to said third and fourth pivot pins, said fifth pivot pin being located on the side of said second pivot pin remote from said first pivot pin and being connected to said compensator means, a second bar having a first portion fixed to said first bar and a second portion parallel to and vertically spaced from said first bar, said second portion having a free end and a fulcrum connected to said first bridge and coaxial with said first pin, an eighth cursor arranged in motion transmitting relationship with said free end and slideably supported by said fifth bridge, an angularly adjustable slideway in operative relationship with said eighth cursor and supported by said fifth bridge and a ninth cursor slideably connected to said fourth bridge and in operative relationship with said eighth cursor.

19. A stereophotogrammetric restorer for restoring surveyed fields comprising a slideably movable housing, a two part stereoscope located in said housing and having an optical system including a reflecting prism, a projecting lens and objective lens, and a Porro system of rectifying prisms for each of the two parts of the stereoscope, said parts including corresponding eyepieces and respective grids, said stereoscope being provided with a stereoscopic photogram carrying platform for a pair of photograms, one of said rectifying prisms of said two parts being slideably displaceable for compensating differences in level when the pair of photograms is not taken on the same level, a pair of photogram supports on said platform, manually operable means for effecting movements of the platform in two orthogonal directions in a plane, adjustment means for adjusting said photogram supports, movable stereoscopic parallax compensator means, a link mechanism coupled to said compensator means, and a drawing apparatus operatively connected to said link mechanism for drawing the surveyed field to be restored, said compensator means being operatively connected with one of said objective lenses.

VALENTIN DOMINGO GRONDONA.

References Cited in the file of this patent

UNITED STATES PATENTS

| Number | Name | Date |
| --- | --- | --- |
| 1,477,082 | Sander | Dec. 11, 1923 |

FOREIGN PATENTS

| Number | Country | Date |
| --- | --- | --- |
| 330,429 | Germany | Dec. 11, 1920 |
| 519,116 | Germany | Feb. 24, 1931 |